(12) United States Patent
Kurishige et al.

(10) Patent No.: US 6,736,236 B2
(45) Date of Patent: May 18, 2004

(54) ELECTRIC POWER STEERING CONTROLLER

(75) Inventors: Masahiko Kurishige, Tokyo (JP);
Hideyuki Tanaka, Tokyo (JP);
Noriyuki Inoue, Tokyo (JP); Chiaki Fujimoto, Tokyo (JP); Kazumichi Tsutsumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 10 days.

(21) Appl. No.: 10/045,019

(22) Filed: Jan. 15, 2002

(65) Prior Publication Data

US 2002/0125063 A1 Sep. 12, 2002

(30) Foreign Application Priority Data

Jan. 17, 2001 (JP) ........................................ 2001-009384

(51) Int. Cl.⁷ ................................................ B62D 5/04
(52) U.S. Cl. ........................... 180/446; 180/443; 701/41
(58) Field of Search ............................... 180/443, 444, 180/446; 701/41, 42

(56) References Cited

U.S. PATENT DOCUMENTS

| 4,992,944 | A | * | 2/1991 | Noto et al. ...................... 701/41 |
| 5,201,818 | A | * | 4/1993 | Nishimoto ................... 180/446 |
| 5,253,725 | A | * | 10/1993 | Nishimoto ................... 180/446 |
| 5,307,892 | A | * | 5/1994 | Phillips ....................... 180/422 |
| 5,719,766 | A | * | 2/1998 | Bolourchi et al. ............. 701/42 |
| 5,729,107 | A | * | 3/1998 | Shimizu et al. .............. 318/432 |
| 6,445,987 | B1 | * | 9/2002 | Kurishige et al. ............. 701/41 |
| 6,450,287 | B1 | * | 9/2002 | Kurishige et al. ........... 180/446 |
| 6,490,514 | B2 | * | 12/2002 | Nishiyama et al. ........... 701/41 |
| 6,496,762 | B2 | * | 12/2002 | Kurishige et al. ............. 701/41 |
| 6,527,079 | B2 | * | 3/2003 | Takeuchi et al. ............. 180/443 |
| 6,570,352 | B2 | * | 5/2003 | Hara et al. ................... 318/432 |
| 6,598,699 | B2 | * | 7/2003 | Takehara et al. ............ 180/446 |

FOREIGN PATENT DOCUMENTS

JP  9-58506  *  3/1997

* cited by examiner

*Primary Examiner*—Lesley D. Morris
*Assistant Examiner*—Daniel Yeagley
(74) *Attorney, Agent, or Firm*—Leydig, Voit & Mayer, Ltd.

(57) ABSTRACT

An electric motor controller for a steering device that can apply an appropriate steering force to a steering wheel according to running conditions. An electric power steering controller of the present invention includes a steering shaft reaction force torque sensor for detecting a reaction force torque of a steering system, a superimposed reaction force torque calculating unit for multiplying a steering angle detected by the steering angle sensor by a gain to calculate a superimposed reaction force torque in the return direction of the steering wheel, and a control unit for controlling the gain so that the superimposed reaction force torque is reduced when a reaction force torque of the steering system is increased and the superimposed reaction force torque is increased when a reaction force torque of the steering system is decreased.

2 Claims, 23 Drawing Sheets

CORRECTED STEERING WHEEL ANGLE F/B COMPENSATION
(PRESENT INVENTION)

SIMPLE STEERING WHEEL ANGLE F/B COMPENSATION
(CONVENTIONAL METHOD)

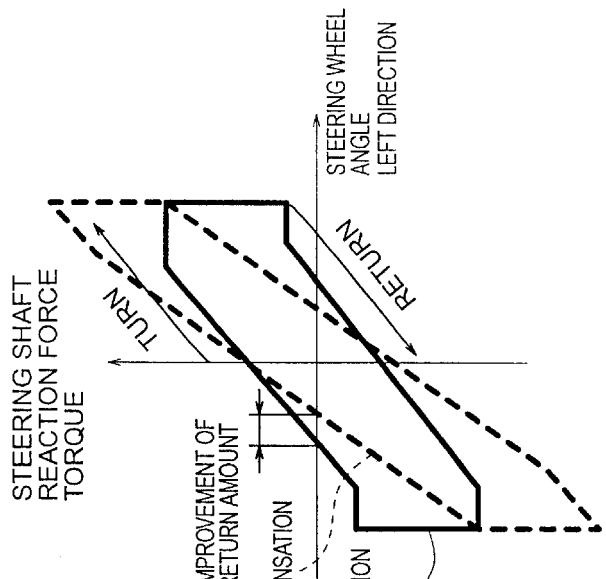
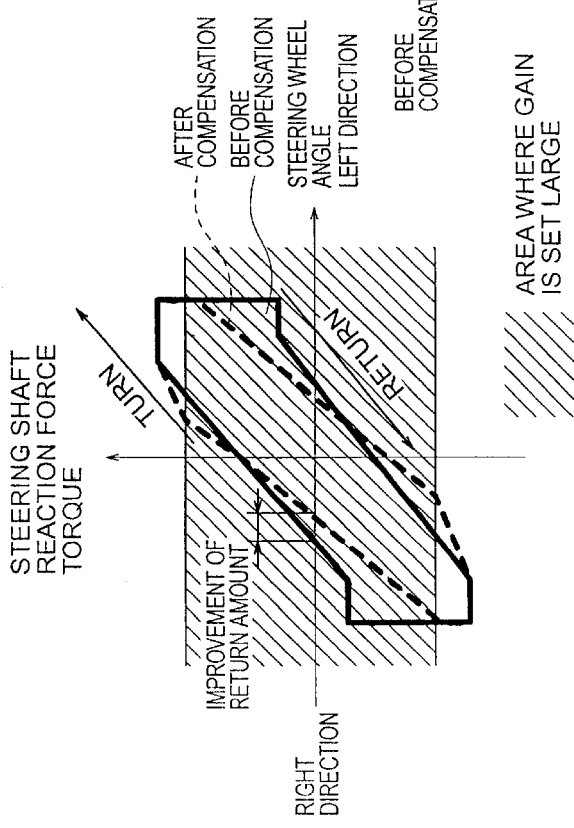

ELECTRIC POWER STEERING CONTROLLER

BACKGROUND OF THE INVENTION

1. Field of the Invention

The present invention relates to a controller of an electric power steering device for assisting steering operation of a vehicle operator by an electric motor connected to a steering system and, more specifically, relates to improvement of steering control performance while a vehicle is running on a road surface with a low friction coefficient by correcting a reaction force torque based on a reaction force of a steering system in an electric power steering device that gives a reaction force torque according to a steering angle of the steering system.

2. Description of the Related Art

Conventionally, there is known an electric power steering device in which an electric motor is connected to a steering system for converting a steering angle applied to a steering wheel by a vehicle operator into a steering angle of road wheels so that steering force of a vehicle operator may be reduced by adding a driving force of this electric motor to the steering system. FIG. 24 illustrates a typical example of such an electric power steering device.

The electric power steering device shown in FIG. 24 is provided with a pinion 4 that is coupled to a steering shaft 2, which is integrally bound to a steering wheel 1, via a connecting shaft 3 having universal joints 3a and 3b, a manual steering force generating mechanism 9 consisting of a rack and pinion mechanism composed of a rack shaft 8 which can mesh with the pinion 4 to move reciprocatingly in the vehicle width direction and both ends of which are coupled to knuckle arms 7, 7 (in FIG. 24, only one of two is shown) of right and left front wheels 6, 6 via tie rods 5, 5, an electric motor 10 that is arranged coaxially with and connected to the rack shaft 8 to provide an assisting steering force for reducing a steering force generated by this manual steering force generating mechanism 9, a steering force detecting means 11 for acting on the pinion 4 and detecting a manual steering force of a vehicle operator, a steering angle detecting means 12 for detecting a rotating angle of the steering wheel 1 and controlling means 13 for controlling an output of the electric motor 10 based on a detection value TP of the steering force detecting means 11 and a detection value θ of the steering angle detecting means 12.

As illustrated in FIG. 25, the controlling means 13 is provided with an output target value generating means 14 for setting a target torque value that should be produced by the electric motor 10 and outputting the target torque value and electric motor driving means 15 for driving and controlling the electric motor 10 based on the target torque value outputted by this output target value generating means 14. The controlling means 13 thus controls an assisting steering force which the controlling means 13 causes the electric motor 10 to generate based on the output TP of the steering force detecting means 11.

Incidentally, in the above-mentioned electric power steering device of the conventional type, in case of steering on a road surface with a low friction coefficient such as a road with accumulated snow, there is a problem in that the assisting steering force tends to be excessive due to a small reaction force of the road surface, which causes a sense of incongruity to the vehicle operator.

Japanese Patent Application Laid-open No. Sho 64-74168 discloses a power steering device which is configured such that a rotational resistance can be given to a steering wheel under predetermined running conditions as a device so as to improve such an inconvenience, that is, the tendency for the vehicle operator to excessively cut the steering wheel 1 on a slippery road.

However, the resistance to the rotation of the steering wheel also resists the rotation of the steering wheel as it returns to its neutral position, and this could cause a substantial discomfort to the vehicle operator. However, since this technique controls the rotational resistance which is added to the steering system according to, for example, a road surface friction coefficient, the resistance is also added to the operation of returning the steering wheel to its neutral position.

Moreover, Japanese Patent Application Laid-open No. Hei 9-58506 discloses an electric power steering control device that controls an output of an electric motor for generating power, which is added to a manual steering system, based on a steering force value to be added to the manual steering system by a vehicle operator and a maximum permissible steering angle value of the manual steering system which is set based on a friction coefficient of a road surface.

However, since this technique controls an output torque of the electric motor to reduce an assisting force by the electric motor to increase a steering reaction force as the steering angle of the manual steering system approaches the limit steering angle (maximum permissible steering angle value), the vehicle operator experiences difficulty in getting a feeling of a slippery road surface and, further, tends to excessively cut the steering wheel on the slippery road surface. Moreover, although it is necessary to detect a friction coefficient of a road surface, left and right road wheels often have different friction coefficients of a road surface, for example, in a case where snow remains only on shoulders of the road. In addition, it is difficult to accurately detect a friction coefficient of a road surface because it changes every moment.

SUMMARY OF THE INVENTION

The present invention has been devised in view of solving the above problems, and it is an object of the present invention to provide an electric power steering controller which can apply a suitable amount of steering reaction force to a steering wheel according to running conditions.

An electric power steering controller for giving a superimposed reaction force torque in the return direction of a steering wheel, comprises: a reaction force torque detecting unit for detecting a reaction force torque a steering system; a superimposed reaction force torque calculating unit for calculating a superimposed reaction force torque in the return direction of a steering wheel; and a control unit for controlling the gain such that the superimposed reaction force torque is reduced when the reaction force torque is large and the superimposed reaction force torque is increased when the reaction force is small.

In the electric power steering controller according to this invention, further comprising a steering angle sensor for detecting a steering angle representing a rotating angle from a neutral position of a steering wheel, the reaction force torque detecting unit is a steering shaft reaction force torque sensor for detecting a reaction force torque of a steering system, the superimposed reaction force torque calculating unit multiplies a steering angle detected by the steering angle sensor by a gain to calculate a superimposed reaction force torque in the return direction of the steering wheel, and the control unit controls the gain such that the superimposed reaction force torque is reduced when a reaction force torque of the steering system is large and the superimposed reaction force torque is increased when a reaction force torque of the steering system is small.

In the electric power steering controller according to this invention, further comprising a steering angle sensor for detecting a steering angle representing a rotating angle from a neutral position of a steering wheel, the reaction force torque detecting unit is a road surface reaction force torque detecting unit for detecting a reaction force torque of a road surface on which a vehicle runs, the superimposed reaction force torque calculating unit multiplies a steering angle detected by the steering angle sensor by a gain to calculate a superimposed reaction force torque in the return direction of the steering wheel, and the control unit controls the gain such that the superimposed reaction force torque is reduced when the road surface reaction force torque is large and the superimposed reaction force torque is increased when the road surface reaction force torque is small.

In the electric power steering controller according to this invention, further comprising a road surface reaction force torque detecting unit for detecting a reaction force torque of a road surface on which a vehicle runs, the reaction force torque detecting unit is a steering shaft reaction force torque sensor for detecting a reaction force torque of a steering system, the superimposed reaction force torque calculating unit multiplies a road surface reaction force torque detected by the road surface reaction force torque detecting unit by a gain to calculate a superimposed reaction force torque in the return direction of a steering wheel, and the control unit controls the gain such that the superimposed reaction force torque is reduced when a reaction force torque of the steering system is large and the superimposed reaction force torque is increased when a reaction force torque of the steering system is small.

In the electric power steering controller according to this invention, the reaction force detecting unit is a road surface reaction force torque detecting unit for detecting a reaction force torque of a road surface on which a vehicle runs, the superimposed reaction force torque calculating unit multiplies a road surface reaction force torque detected by the road surface reaction force torque detecting unit by a gain to calculate a superimposed reaction force torque in the return direction of a steering wheel, and the control unit controls the gain such that the superimposed reaction force torque is reduced when the road surface reaction force torque is large and the superimposed reaction force torque is increased when the road surface reaction force torque is small.

In the electric power steering controller according to this invention, further comprising a quantity of state sensor for detecting a quantity of state of any one of a yaw rate, a lateral acceleration and a side slip angle of a vehicle, the reaction force torque detecting unit is a steering shaft reaction force torque sensor for detecting a reaction force torque of a steering system, the superimposed reaction force torque calculating unit multiplies a quantity of state of any one of a yaw rate, a lateral acceleration and a side slip angle of a vehicle detected by the quantity of state sensor by a gain to calculate a superimposed reaction force torque in the return direction of a steering wheel, and the control unit controls the gain such that the superimposed reaction force torque is reduced when a reaction force torque of the steering system is large and the superimposed reaction force torque is increased when a reaction force of the steering system is small.

The electric power steering controller according to the invention further comprises a quantity of state sensor for detecting a quantity of state of any one of a yaw rate, a lateral acceleration and a side slip angle of a vehicle, the reaction force torque detecting unit is a road surface reaction force torque detecting unit for detecting a reaction force torque of a road surface on which a vehicle runs, the superimposed reaction force torque calculating unit multiplies a quantity of state of any one of a yaw rate, a lateral acceleration and a side slip angle of a vehicle detected by the quantity of state sensor by a gain to calculate a superimposed reaction force torque in the return direction of a steering wheel, and the control unit controls the gain such that the superimposed reaction force torque is reduced when the road surface reaction force torque is large and the superimposed reaction force torque is increased when the road surface reaction force torque is small.

In the electric power steering controller according to this invention, further comprising: a steering angle sensor for detecting a steering angle representing a rotating angle from a neutral position of a steering wheel; a motor current detector for detecting a motor current to be supplied to an electric motor for power steering connected to a steering system; and a steering torque sensor for detecting a torque at the time when a vehicle operator operates a steering wheel, the reaction force torque detecting unit consists of a steering shaft reaction force torque calculating unit for estimating a reaction force torque of a steering system from a motor current detected by the motor current detector and a steering torque detected by the steering torque sensor, the superimposed reaction force torque calculating unit multiplies a steering angle detected by the steering angle sensor by a gain to calculate a superimposed reaction force torque in the return direction of a steering wheel, and the control unit controls the gain such that the superimposed reaction force torque is reduced when a reaction force torque of the steering system is large and the superimposed reaction force torque is increased when a reaction force torque of the steering system is small.

In the electric power steering controller according to this invention, a reaction force torque Ttran of the steering system is calculated by the following expression:

$$Ttran = Thdl + Tassist - J \cdot dw/dt$$

where Thdl is a steering torque, Tassist is an assist torque by a motor and $J \cdot dw/dt$ is an inertia torque of the motor.

In the electric power steering controller according to this invention, the road surface reaction force torque is calculated by subtracting a friction torque of the steering system from a reaction force torque of the steering system.

BRIEF DESCRIPTION OF THE DRAWINGS

In the accompanying drawings:

FIG. 6A illustrates a relationship between a steering wheel angle and a steering shaft reaction force torque on a slippery road surface in the first embodiment of the present invention;

FIG. 6B illustrates a relationship between a steering wheel angle and a steering shaft reaction force torque on a slippery road surface in the first embodiment of the conventional art;

DETAILED DESCRIPTION OF THE PREFERRED EMBODIMENTS

Embodiments of the present invention will be hereinafter described with reference to the accompanying drawings.

First Embodiment

Figure 1:
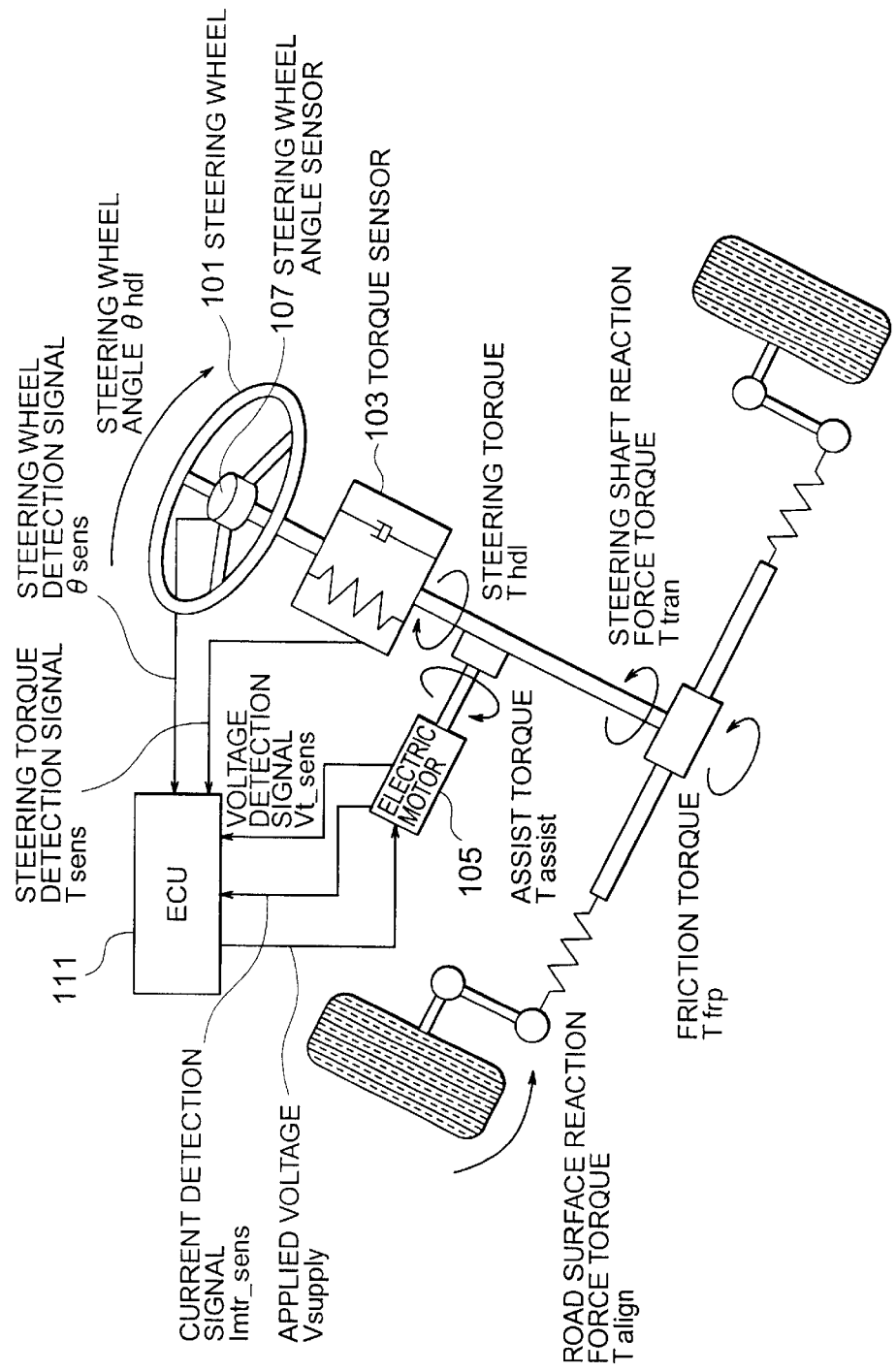
FIG. 1 illustrates a schematic configuration of an electric power steering controller in accordance with the present invention.

FIG. 1 illustrates a schematic configuration of an electric power steering controller in accordance with the present invention. The electric power steering controller shown in FIG. 1 performs main functions of measuring a steering torque Thdl applied to a steering system with a torque sensor 103 when a vehicle operator turns a steering wheel 101 and causing an electric motor 105 to generate an assist torque Tassist according to the measurement of the steering torque. In addition, the electric power steering controller may be provided with a steering wheel angle sensor 107 for detecting a rotational angle (steering wheel angle) of the steering wheel 101 and a rotational sensor (not shown) for detecting a rotational angle (motor angle) or a rotating speed (motor angular speed) of an electric motor 105 (which may be differentiated to obtain a motor angular acceleration) to input outputs of the sensors in an electronic control unit (ECU) 111. Further, a current flowing to the electric motor 105 (current detecting signal) and a voltage applied between motor terminals (voltage detecting signal) are also captured in the ECU in order to realize better steering feeling and steering stability.

Dynamically, a sum of the steering torque Thdl and the assist torque Tassist causes the steering system to rotate against a reaction force of the steering system (hereinafter referred to as steering shaft reaction force torque) Ttran. When the steering wheel 101 is rotated, an inertia force J·dw/dt of the electric motor 105 also acts and, consequently, the following expression is established.

$$Ttran = Thdl + Tassist - J \cdot dw/dt$$

As to the assist torque Tassist by the electric motor 105, the following expression is established.

$$Tassist = Ggear \cdot Kt \cdot Imtr$$

Here, Ggear is a gear ratio of a decelerating gear for transmitting an assist torque from the electric motor 105 to the steering shaft 101, Kt is a torque coefficient and Imtr is a current (motor current) flowing through the electric motor 105.

In addition, the steering shaft reaction force torque Ttran is a sum of a road surface reaction force torque Talign representing a reaction force from a road surface on which a vehicle runs and a frictional torque Tfrp inside a steering mechanism. The road surface reaction force torque is the smallest when the vehicle moves straight forward. It increases in proportion to a steering wheel angle until the steering wheel becomes a predetermined angle and, after the steering wheel angle exceeds the predetermined angle, gradually decreases as the steering wheel angle increases. On the other hand, the frictional torque is constant in magnitude and has a characteristic that its sign changes depending on the direction in which the steering wheel is turned. Therefore, the steering shaft reaction force torque in turning the steering wheel increases when the steering wheel is turned and decreases when the steering wheel is returned even if the steering angle is the same.

In the case of this embodiment, a gain for calculating a superimposed reaction force torque is made variable, whereby the superimposed reaction force torque is reduced when the steering shaft reaction force torque is large and is increased when the steering shaft reaction force torque is small.

The ECU 111 calculates a target value of current supplied to the electric motor 105 (motor current target value) from each of the sensor signals and controls current such that an actual current flowing through the electric motor 105 coincides with this motor current target value. Consequently, the electric motor 105 generates a predetermined torque that is found by multiplying the current value Imtr by the torque constant Kt and the gear ratio Ggear and assists a torque generated by steering of a vehicle operator.

Figure 2:
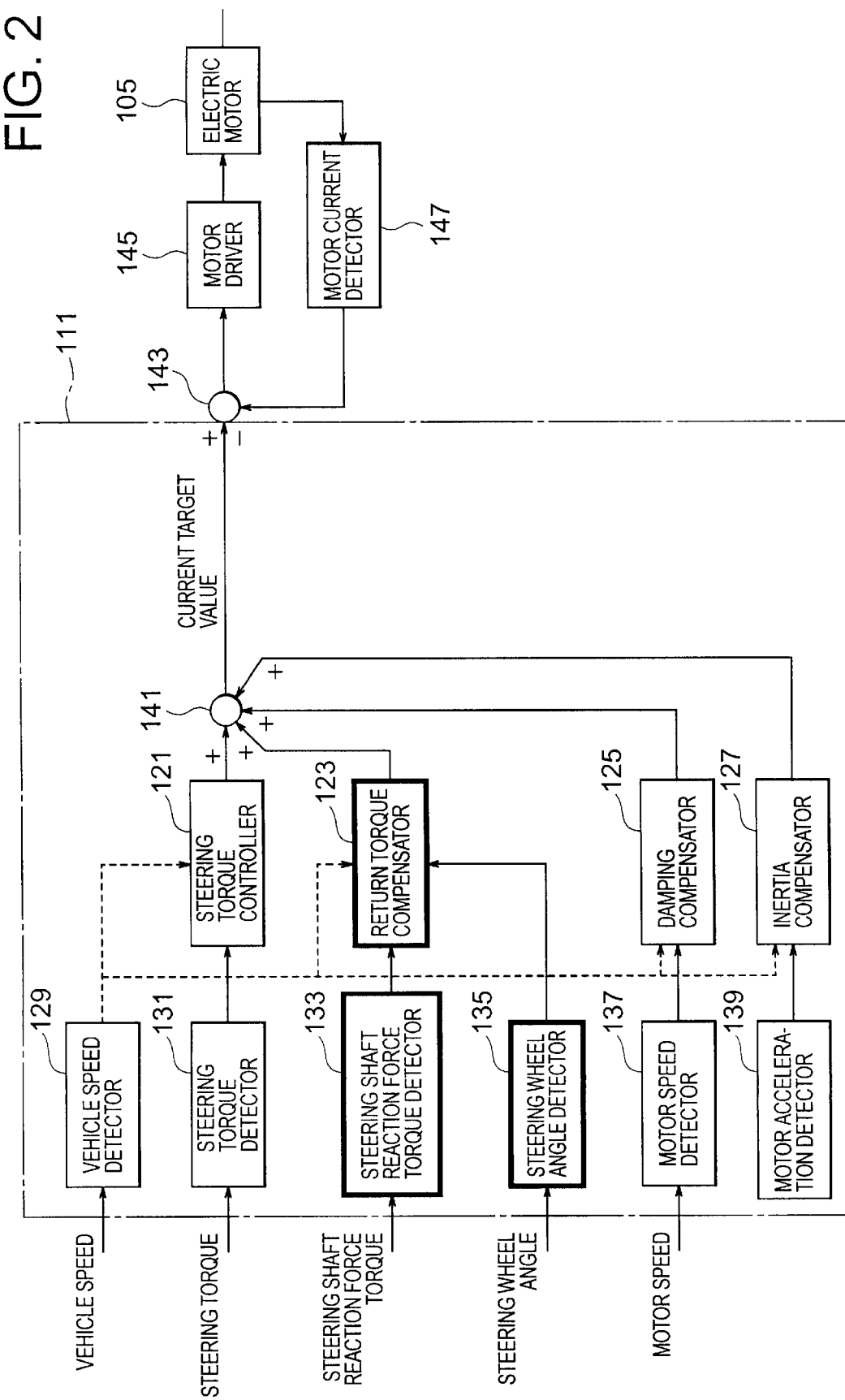
FIG. 2 is a block diagram showing a functional configuration of an ECU according to a first embodiment of the present invention.

FIG. 2 is a block diagram showing a functional configuration of the ECU 111 in accordance with the first embodiment of the present invention. In the figure, the part surrounded by alternate long and short dot lines is a portion for calculating a target value of a current to be applied to the electric motor 105.

As shown in FIG. 2, the ECU 111 is provided with a steering torque controller 121, a return torque compensator 123, a damping compensator 125, an inertia compensator 127, a vehicle speed detector 129 in which a vehicle speed signal from a not-shown vehicle speed sensor is input to detect vehicle speed, a steering torque detector 131 in which a steering torque signal from the torque sensor 103 is input, a steering shaft reaction force torque detector 133 into which a steering shaft reaction force torque signal is input, a steering wheel angle detector 135 into which a steering wheel angle from the steering wheel sensor 107 (rotational angle from a steering wheel neutral position) is input. A motor speed detector 137 into which a voltage detection signal and a current detection signal are input from the electric motor 105 to detect rotating speed of the electric motor 105 and a motor acceleration detector 139 for calculating rotational acceleration of the electric motor 105 from an output of the motor speed detector 137. Vehicle speed detection signals are input into these controllers and compensators and control parameters are changed based on the input vehicle speed detection signals. In addition, an output of the steering torque controller 121 is input to an adder 141, in which outputs of the return torque compensator 123, the damping compensator 125, and the inertia compensator 127 are added to the output of the steering torque controller 121 to calculate a current target value. This current target value is input to a subtractor 143, where an output (motor current value) of a motor current detector 147 for detecting a current flowing through the electric motor 105 is subtracted from the current target value. The difference between the values is input to a motor driver 145. The motor driver 145 controls current supplied to the electric motor 105 based on an output signal from the subtractor 143. Here, since a new element is the return torque compensator 123 in the present invention, the return torque compensator 123 will be hereinafter described in detail.

Figure 3:
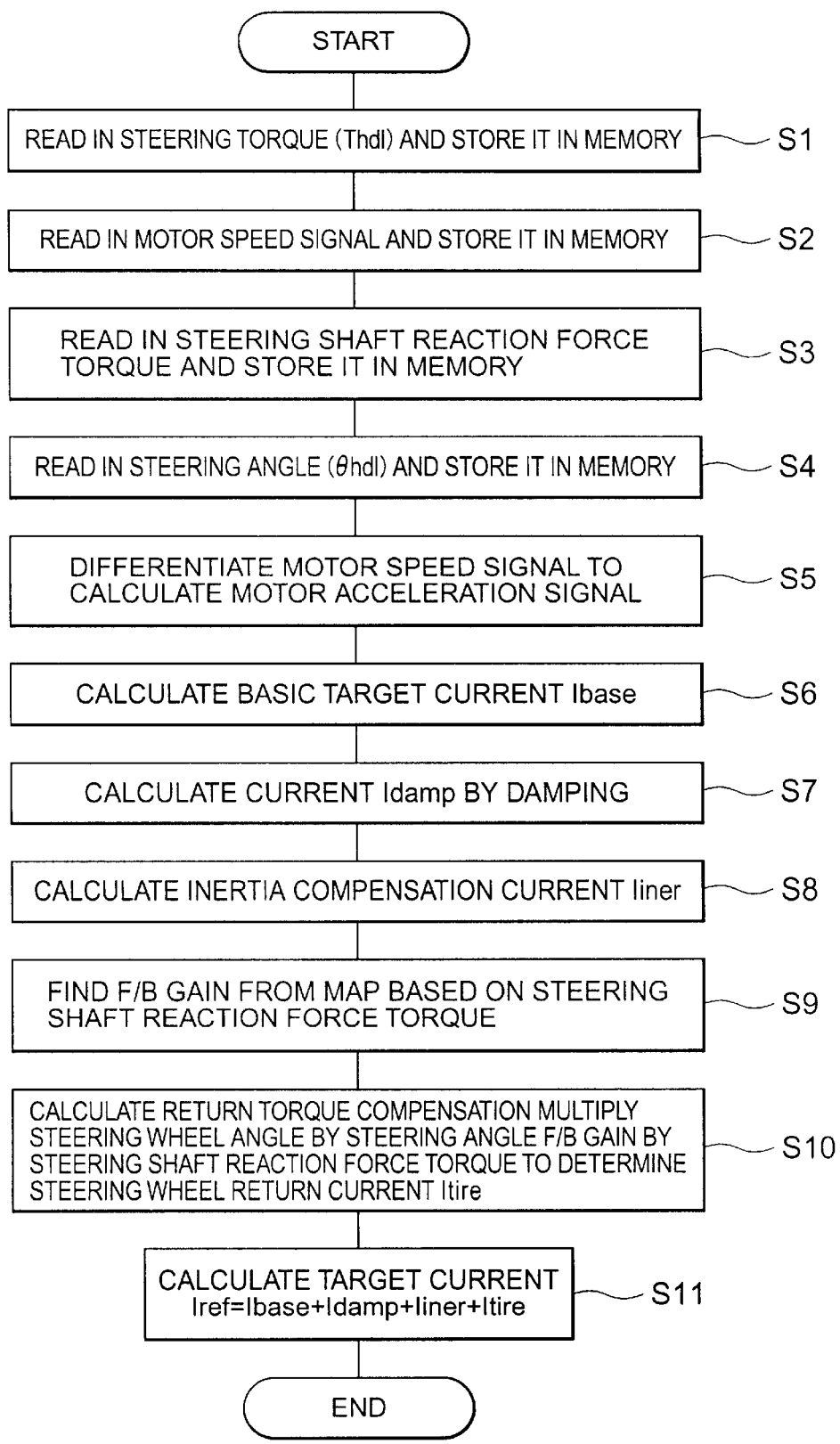
FIG. 3 is a flow chart showing operations of a return torque compensating unit according to the first embodiment of the present invention.
Figure 4:
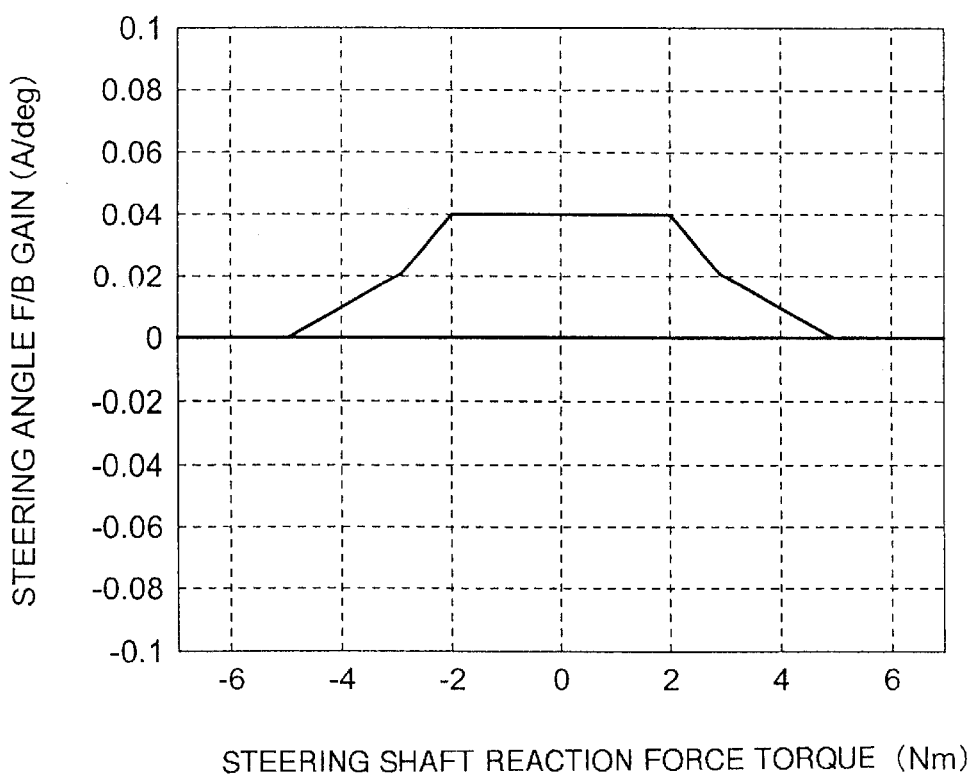
FIG. 4 is a map diagram showing a relation between a reaction force of a steering shaft and a gain in the first embodiment of the present invention.

Operations of the return torque compensator 123 are described based on the flow chart of FIG. 3. First, a detected steering torque Thdl is read in and stored in a memory (step S1), a motor speed signal is read in and stored in the memory (step S2), a steering shaft reaction force torque is read in and stored in the memory (step S3), and a steering angle θhdl is read in and stored in the memory (step S4). Subsequently, the motor speed signal is differentiated to calculate a motor acceleration signal (step S5), a basic target current Ibase is calculated based on the steering torque Thdl (step S6), a damping current Idamp is calculated (step S7) and an inertia compensating current Iiner is calculated (step S8). Next, a steering angle feedback (F/B) gain is determined according to a graph (a relationship between steering shaft reaction force torque and F/B gain) as shown in FIG. 4 from a steering shaft reaction force torque (step S9). The steering angle F/B gain is small when a steering wheel is turned and is large when the steering wheel is returned. The steering angle θhdl is multiplied by the steering angle F/B gain, based on the steering shaft reaction force torque, to find a steering wheel return current Itire (step S10). The steering wheel return current Itire is added to the basic target current Ibase to calculate a target current Iref (step S11). Since the steering wheel return current Itire is added to the basic target current Ibase, i.e., is superimposed on the basic target current, the steering wheel return current functions as a superimposed reaction force torque.

Figure 5A:
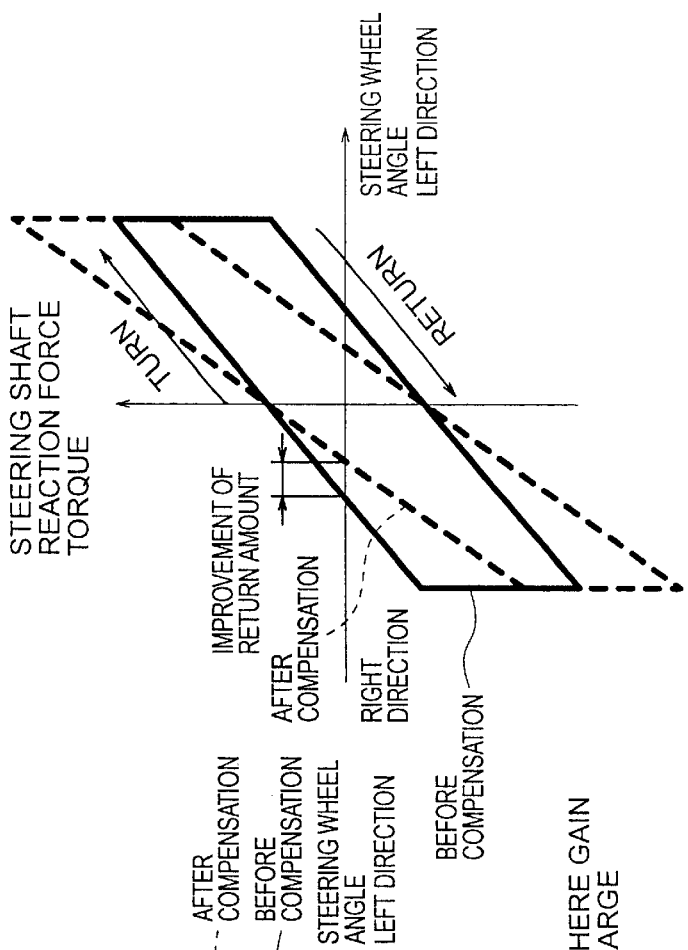
FIG. 5A illustrates a relation between a steering wheel angle and a steering shaft reaction force torque in the first embodiment of the present invention.
Figure 5B:
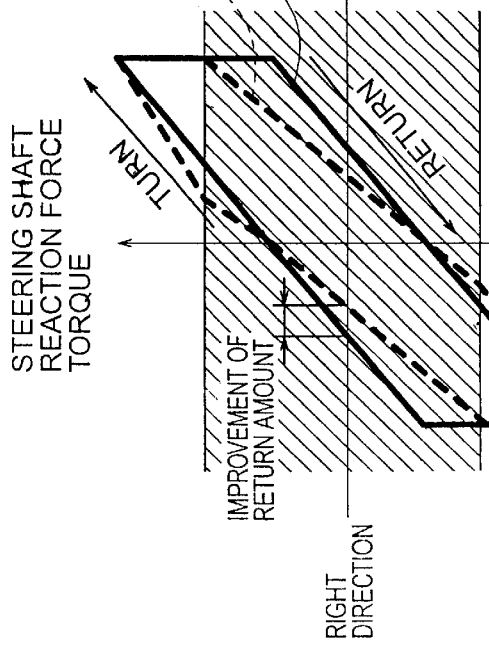
FIG. 5B illustrates a relationship between a steering wheel angle and a steering shaft reaction force torque in the conventional art.

According to this first embodiment, the F/B gain for calculating the superimposed reaction force torque is a variable that varies with the steering angle, so that the superimposed reaction force torque decreases when the steering shaft reaction force torque becomes relative large and increases when the steering shaft reaction force torque becomes small. Thus, as shown in FIG. 5A, the return of a steering wheel is improved so that a driver maintains a proper feeling of steering at the end of turning of the wheel and return of the wheel to the neutral position. This result is achieved by ensuring that the steering shaft reaction force, after compensation by adding a superimposed reaction force torque calculated using a variable F/B gain, is prevented from becoming large, as compared to calculating a compensating reaction force torque based upon a constant gain (FIG. 5B). In addition, on a slippery road surface, if the F/B gain is constant, a reduction in the road surface reaction force is difficult to detect when the steering wheel is gradually turned (FIG. 6B). However, since a vehicle operator can easily sense a slippery road when the F/B gain used in calculating torque that varies with the steering angle (FIG. 6A), the tendency of the vehicle operator to excessively steer the vehicle on a slippery road can be prevented.

Second Embodiment

Figure 7:
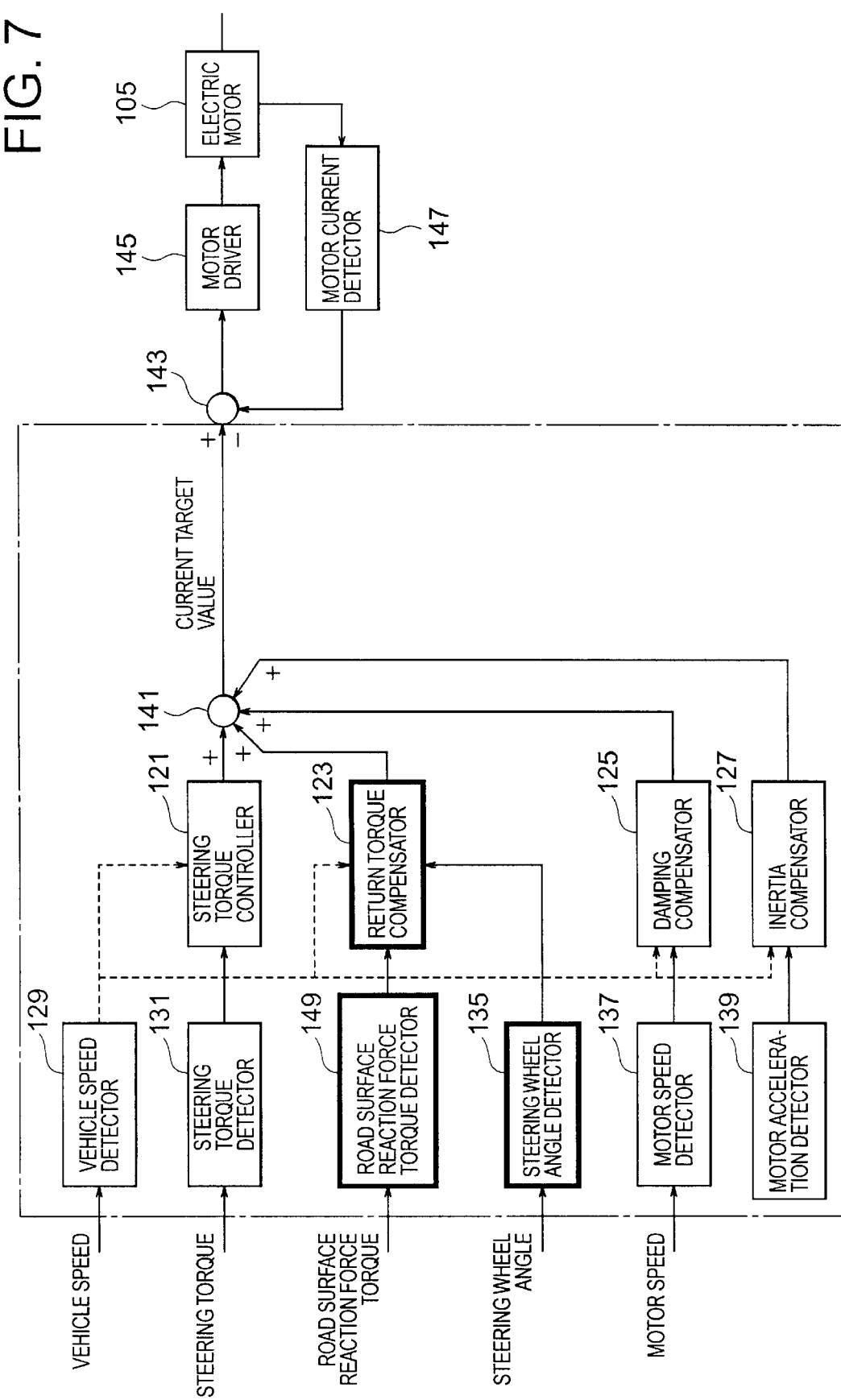
FIG. 7 is a block diagram showing a functional configuration of an ECU according to a second embodiment of the present invention.

FIG. 7 is a block diagram showing a functional configuration of a second embodiment of the present invention. In the figure, the part surrounded by alternate long and short dash lines is a portion for calculating a target value of a current to be applied to the electric motor 105.

In the return torque compensator 123, a steering wheel angle detected by the steering wheel angle detector 135 is multiplied by a gain to calculate a superimposed reaction force torque, which is outputted to the adder 141 for calculating a sum of outputs of the controllers/compensators. In the above-mentioned first embodiment, the gain at this point is changed according to an output of the steering shaft reaction force torque detector 133. In this second embodiment, the gain is changed based on an output of a road surface reaction force torque detector 149. The other steps are completely the same as those in the above-mentioned first embodiment.

Figure 8:
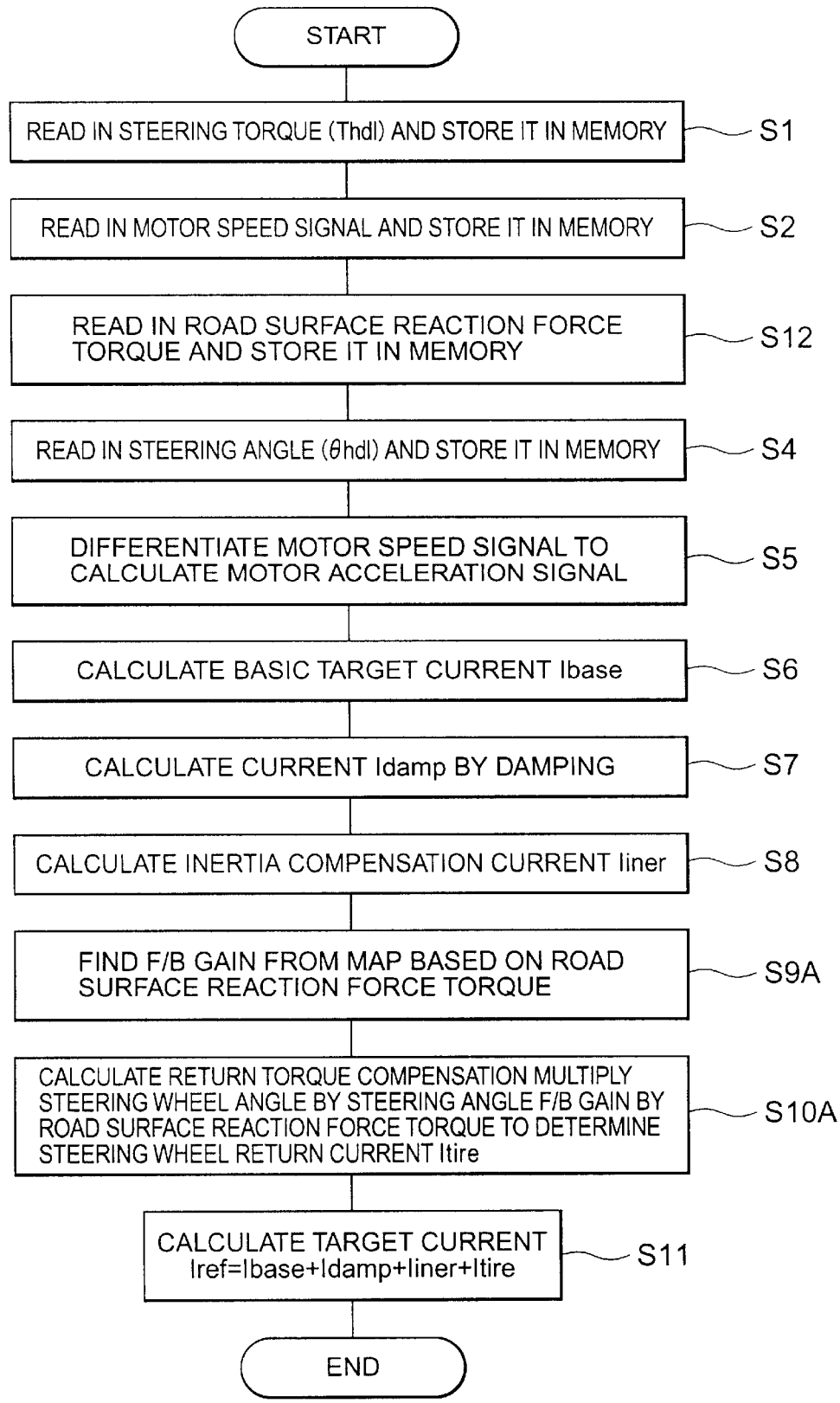
FIG. 8 is a flow chart showing operations of a return torque compensating unit of the second embodiment of the present invention.

Operations of this second embodiment will be described based on a flow chart of FIG. 8. In the above-mentioned first embodiment, a steering shaft reaction force torque is read in and stored in a memory in step S3 of the flow chart of FIG. 3 and a steering angle F/B gain is changed according to an output of the steering shaft reaction force torque detector 133 in step S9. As shown in FIG. 8, in this second embodiment, after a motor speed signal is read in and stored in a memory in step S2, a road surface reaction force torque is read in and stored in the memory in step S12, a steering angle F/B gain is changed based on an output of the road surface reaction force torque detector 149 in step S9A after step S8 and a steering angle θhdl is multiplied by the steering angle F/B gain by the road surface reaction force torque in step S10 to find a steering wheel return current Itire. The other steps of this second embodiment are completely the same as those in the above-mentioned first embodiment.

In this second embodiment, the same effects as described in the above-mentioned first embodiment can be expected. In addition, since, for example, a load cell is provided in a rack of a rack and pinion mechanism, if a road surface reaction force torque is directly measured, it is sufficient to configure an ECU to change a gain based on a road surface reaction force torque rather than a steering shaft reaction force torque as indicated in this second embodiment.

Third Embodiment

Figure 9:
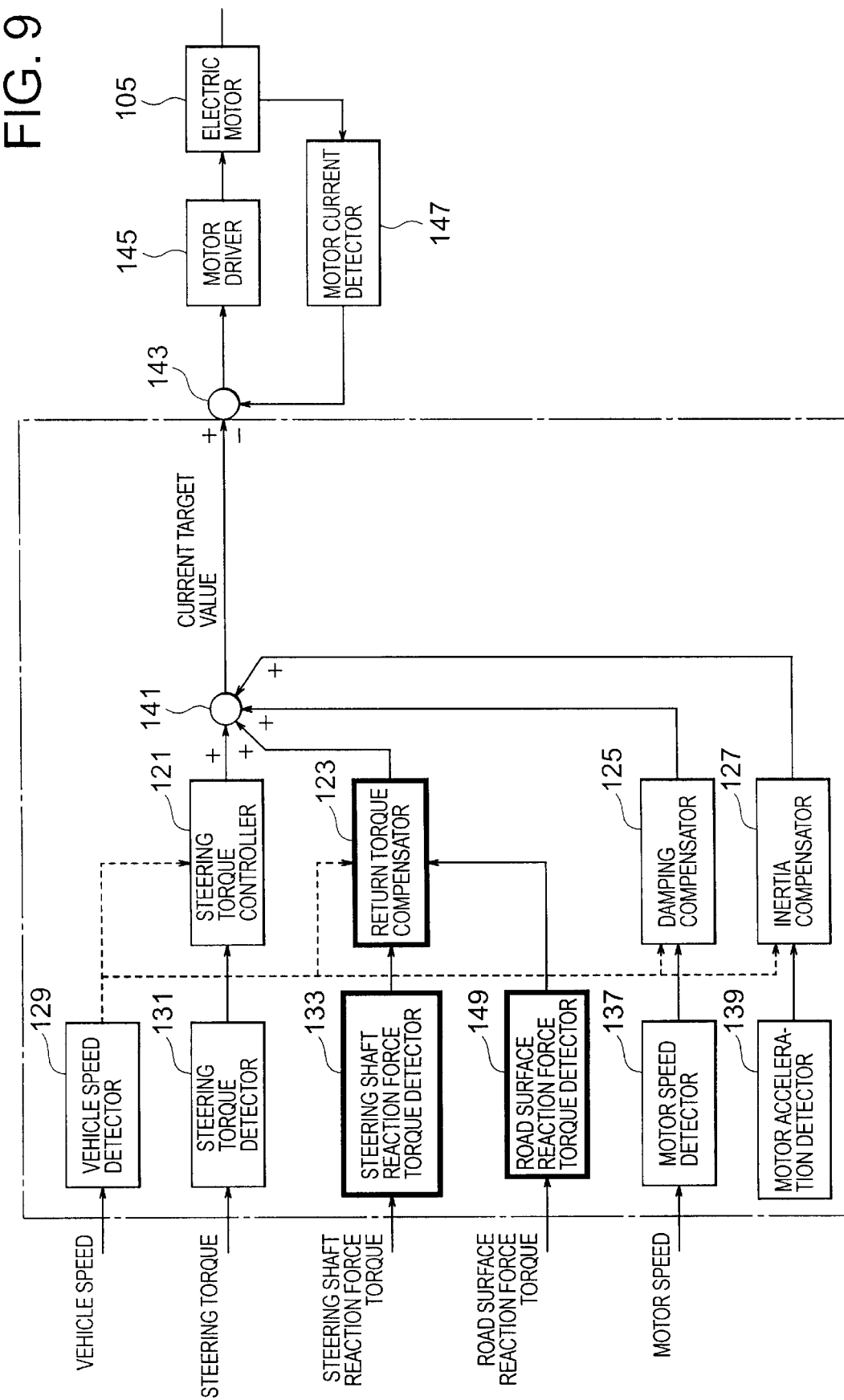
FIG. 9 is a block diagram showing a functional configuration of an ECU according to a third embodiment of the present invention.

FIG. 9 is a block diagram showing a functional configuration of a third embodiment of the present invention. In the figure, the part surrounded by alternate long and short dash lines is a portion for calculating a target value of a current to be applied to the electric motor 105. In this third embodiment, the road surface reaction force torque detector 149 for detecting a road surface reaction force torque is provided instead of the steering wheel angle detector 135 of the above-mentioned first embodiment.

In the above-mentioned first embodiment, a steering wheel angle is multiplied by a gain to calculate a superimposed reaction force torque. In this third embodiment, a road surface reaction force torque is multiplied by a gain to calculate a superimposed reaction force torque. That is, after step S2, a road surface reaction force torque is read in and stored in a memory in step S12, a steering shaft reaction force torque is read in and stored in the memory next in step S13, a steering angle F/B gain is determined in accordance with a map chart as shown in FIG. 4 from the steering angle shaft reaction force torque in step S9 and, then, the road surface reaction force torque from the road surface reaction force torque detector 149 is multiplied by a gain to calculate a superimposed torque in step S10B. This superimposed reaction force torque is outputted to the adder 141 that calculates a sum of outputs of controllers/compensators. In this third embodiment, the other steps are completely the same as those of the above-mentioned first embodiment and a gain is changed according to an output of the steering shaft reaction force torque detector 133. A surface reaction force torque F/B gain is small when a steering wheel is turned and is large when the steering wheel is returned.

According to this third embodiment, even if a steering wheel angle is not detected, if a steering shaft reaction force torque is small, a superimposed reaction force torque that is substantially proportional to a turning angle of a steering wheel can be generated and, if the steering shaft reaction force is large, the superimposed reaction force torque can be reduced.

Fourth Embodiment

Figure 11:
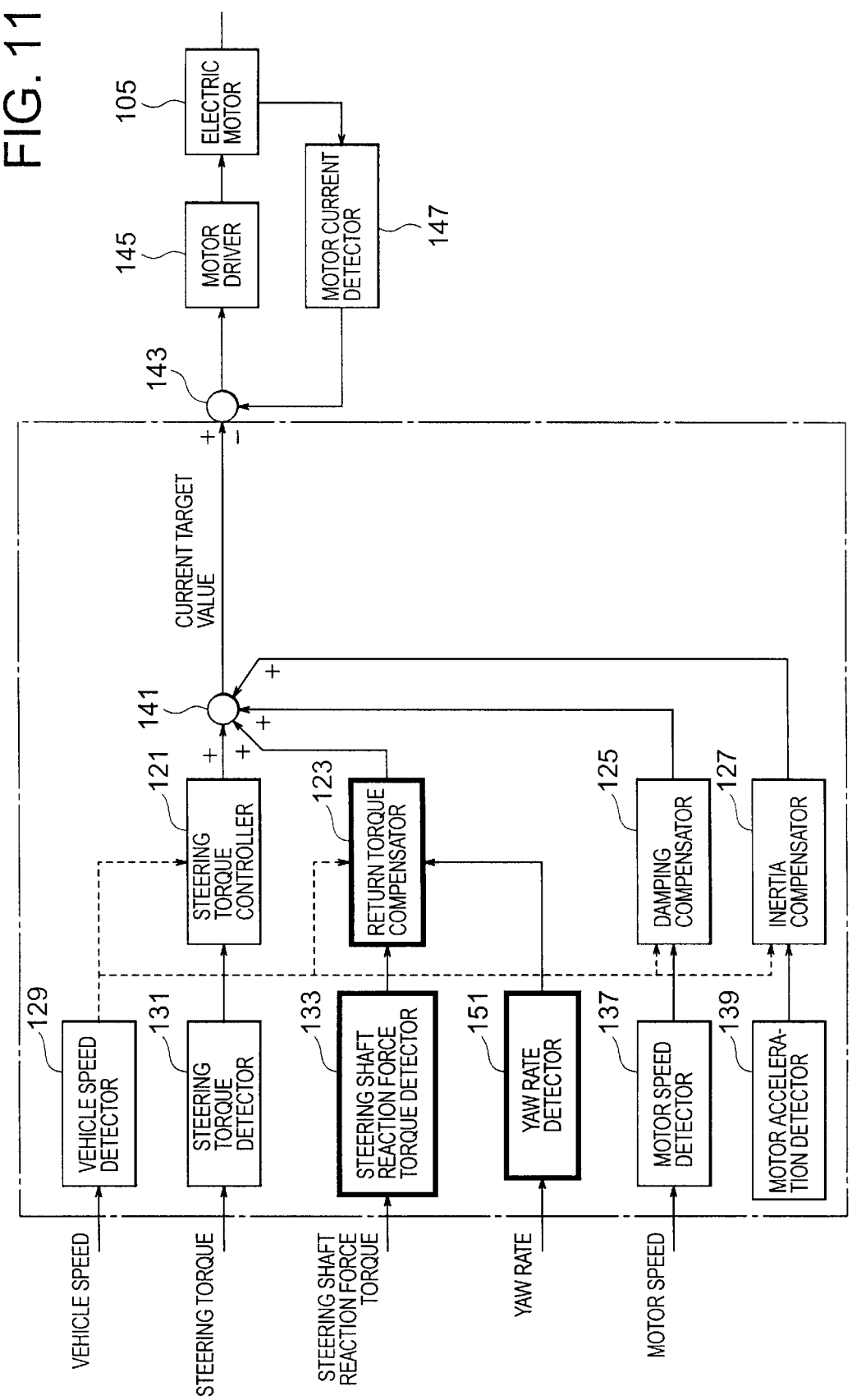
FIG. 11 is a block diagram showing a functional configuration of an ECU according to a fourth embodiment of the present invention.

FIG. 11 is a block diagram showing a functional configuration of a fourth embodiment of the present invention. In the figure, the part surrounded by alternate long and short dash lines is a portion for calculating a target value of a current to be applied to the electric motor 105.

In the above-mentioned first embodiment, a steering wheel angle is multiplied by a gain to calculate a superim-posed reaction force torque. In this fourth embodiment, a yaw rate is multiplied by a gain to calculate a superimposed reaction force torque, which is outputted to the adder 141 that calculates a sum of outputs of controllers/compensators. In this fourth embodiment, the other steps are completely the same as those of the above-mentioned first embodiment and a gain is changed according to an output of the steering shaft reaction force torque detector 133.

Figure 12:
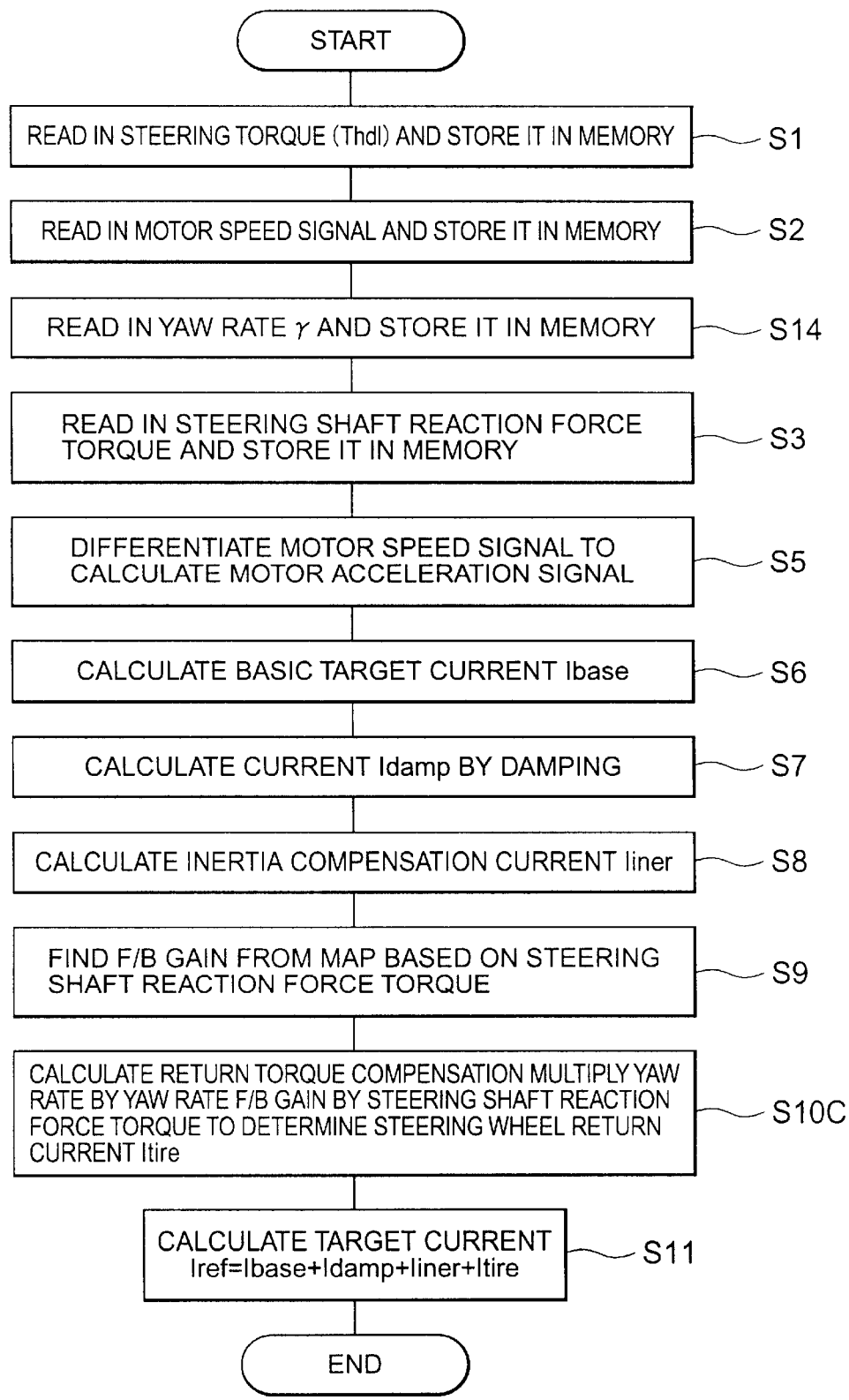
FIG. 12 is a flow chart showing operations of a return torque compensating unit of the fourth embodiment of the present invention.

Operations of this fourth embodiment will be described based on a flow chart of FIG. 12. In the above-mentioned first embodiment, a steering wheel angle is multiplied by a gain to calculate a superimposed reaction force torque. In this fourth embodiment, after step S2, a yaw rate γ is read in and stored in a memory in step S14 and the yaw rate γ is multiplied by a gain to calculate a superimposed reaction force torque in step S10C. The other steps are completely the same as those of the above-mentioned first embodiment and a gain is changed according to an output of the steering shaft reaction force torque detector 133. A yaw rate F/B gain is small when a steering wheel is turned and is large when the steering wheel is returned. In addition, the ECU 111 may be configured to, instead of multiplying the yaw rate γ, multiply a lateral acceleration or a side slip angle, which is a quantity of state of a vehicle other than the yaw rate γ, by a gain.

In the case of this fourth embodiment, a superimposed reaction force torque is made a product of a yaw rate and a gain, whereby a superimposed reaction force torque according to a vehicle behavior can be generated. As a result, in such a case in which a vehicle is about to spin out, if a yaw rate is shown large despite a small steering wheel angle, since a large superimposed reaction force torque can be given, a vehicle operator can easily perform a counter steer operation for preventing spinning.

Fifth Embodiment

Figure 13:
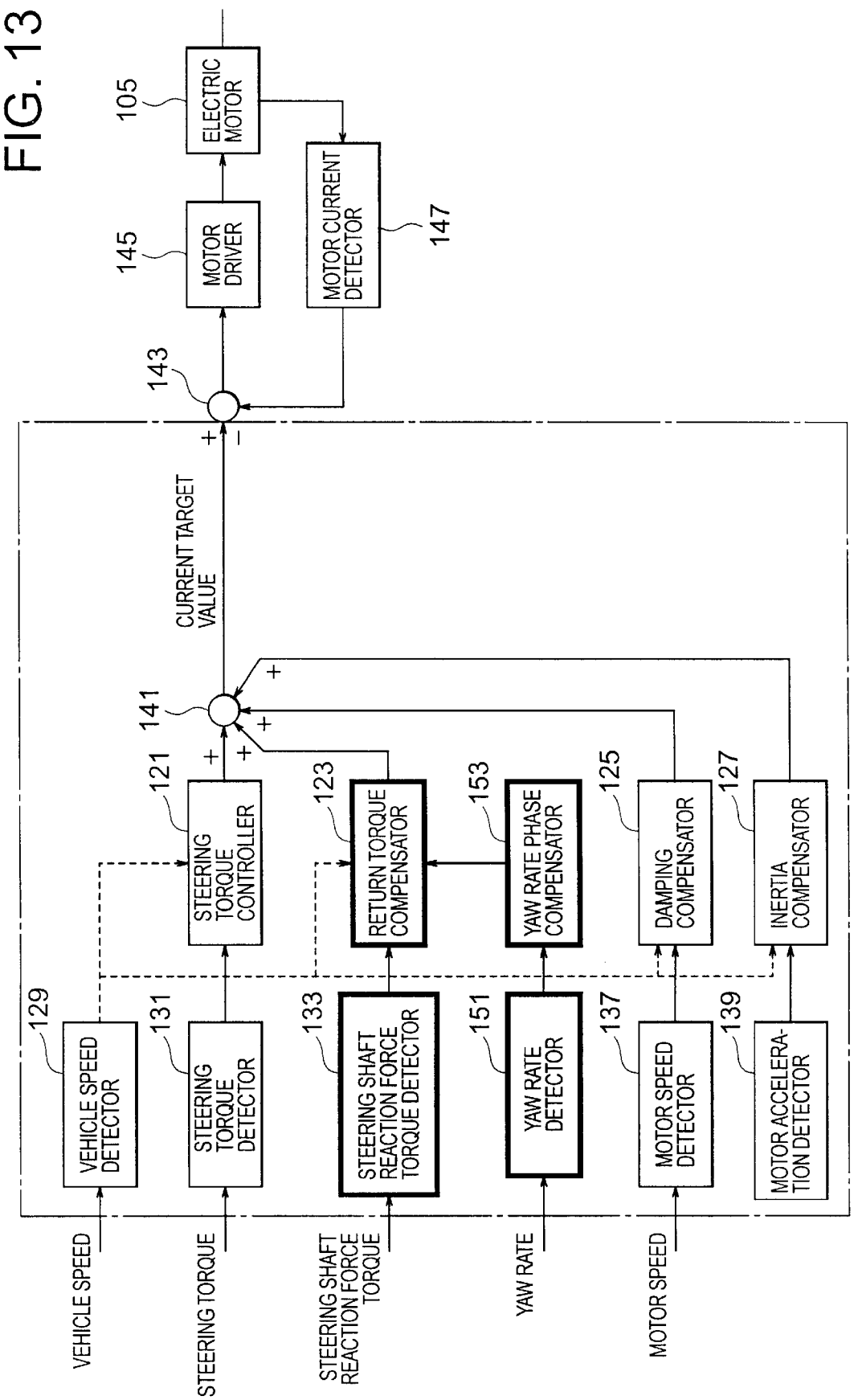
FIG. 13 is a block diagram showing a functional configuration of an ECU according to a fifth embodiment of the present invention.

FIG. 13 is a block diagram showing a functional configuration of a fifth embodiment of the present invention. In the figure, the part surrounded by alternate long and short dash lines is a portion for calculating a target value of a current to be applied to the electric motor 105.

In this fifth embodiment, a yaw rate detected in the above-mentioned fourth embodiment and applied phase compensation thereto is multiplied by a gain to calculate a superimposed reaction force torque, which is outputted to the adder 141 that calculates a sum of outputs of controllers/compensators. In this fourth embodiment, the other steps are completely the same as those of the above-mentioned fourth embodiment and a gain is changed according to an output of the steering shaft reaction force torque detector 133.

Figure 14:
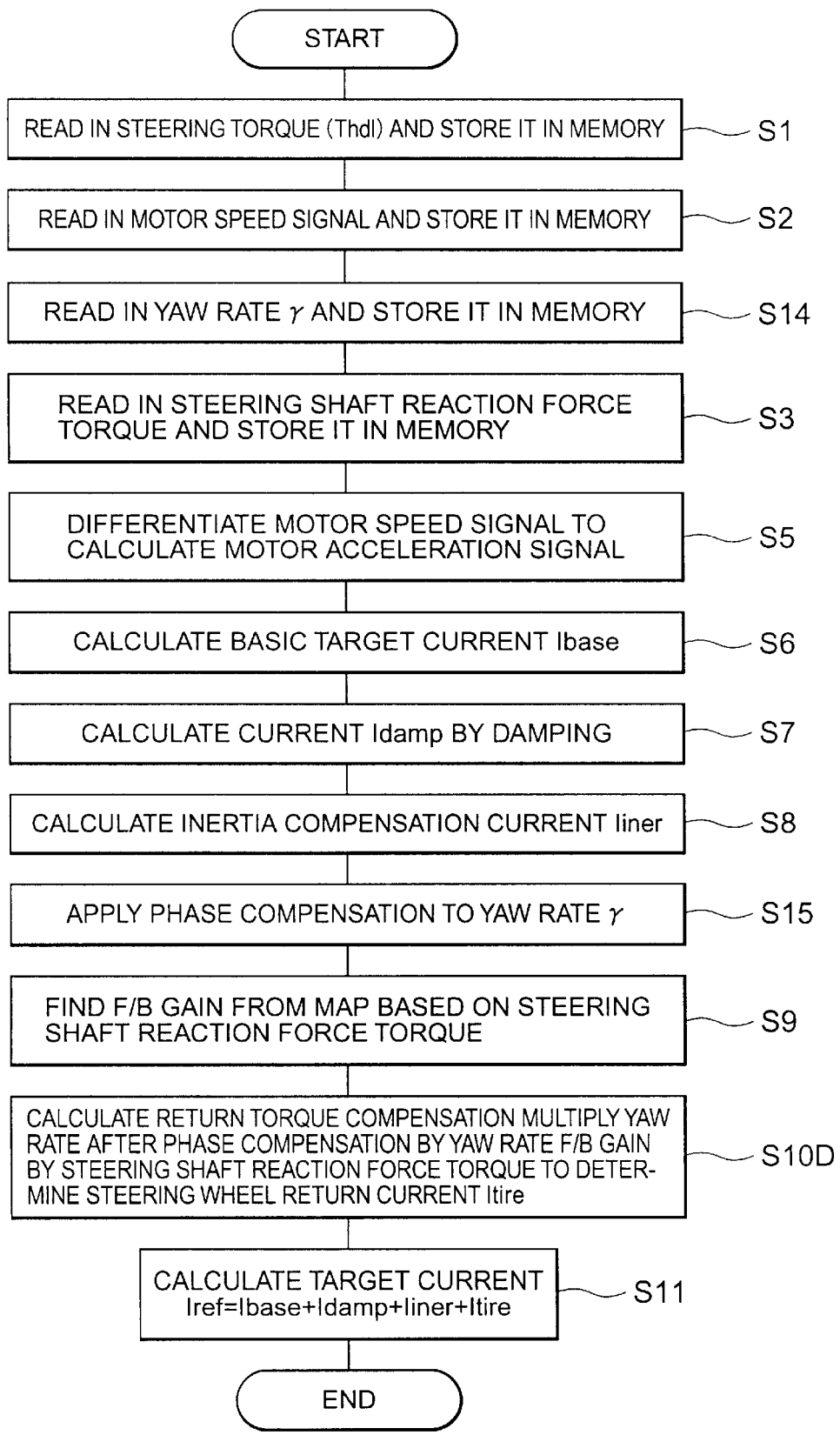
FIG. 14 is a flow chart showing operations of a return torque compensating unit of the fifth embodiment of the present invention.

Operations of this fifth embodiment will be described based on a flow chart of FIG. 14. In the above-mentioned fifth embodiment, phase compensation is applied to a yaw rate γ detected in the above-mentioned fourth embodiment in a manner described later in step S15 after step S8, and the yaw rate γ to which phase compensation is applied (γp) is multiplied by a gain to find a superimposed reaction force torque in step S10D after step S9. The other steps are completely the same as those of the above-mentioned fourth embodiment and a gain is changed according to an output of the steering shaft reaction force torque detector 133. A yaw rate F/B gain is small when a steering wheel is turned and is large when the steering wheel is returned. In addition, the ECU 111 may be configured to, instead of multiplying the yaw rate, multiply a lateral acceleration or a side slip angle β, which is a quantity of state of a vehicle other than the yaw rate, by a gain.

Phase compensation is calculated according to a calculation shown below. (Reference: Kabaya Kogyo Kabushiki Kaisha:"Operability and operational stability of an automobile", Sankaido, p175 (1996))

In the case of phase compensation of a yaw rate:

A transfer function from a steering wheel angle to a yaw rate is represented by the following expression.

$$G_\theta^\gamma(s) = \frac{1}{D(s)}\frac{1}{n}\left(mK_f l_f s + \frac{K_f K_r l}{V}\right) \quad \text{[Expression 1]}$$

D(s) is represented by the following expression.

$$D(s) = Im\, s^2 + \quad \text{[Expression 2]}$$
$$\frac{1}{V}\{(K_f + K_r)I + (K_f l_f^2 + K_r l_r^2)m\}s + \frac{K_f K_r l^2}{V^2}(I + AV^2)$$

Here,
  m: weight of a vehicle
  I: inertia moment about the z axis through the center of gravity of a vehicle
  L: wheel base (l=lf+lr)
  lf, lr: horizontal distances from front and rear axles to the center of gravity
  Ff, Fr: cornering forces of front and rear road wheels
  Kf, Kr: cornering powers of front and rear road wheels
  n: steering gear ratio
  V: vehicle speed
  θ: steering angle of a steering wheel
  γ: yaw rate
  s: Laplace operator
  A: stability factor A is represented by the following expression.

$$A = -\frac{m}{l^2}\frac{K_f l_f - K_r l_r}{K_f K_r} \quad \text{[Expression 3]}$$

The above-mentioned transfer function from a steering wheel angle to a yaw rate can be simply represented by the following expression.

$$G_\theta^\gamma(s) = \frac{a_1 s + a_0}{b_2 s^2 + b_1 s + b_0} \quad \text{[Expression 4]}$$

A transfer function from a yaw rate to a steering wheel angle can be represented by the following expression based on the above-mentioned transfer function.

$$G_\gamma^\theta(s) = \frac{b_2 s^2 + b_1 s + b_0}{a_1 s + a_0} \quad \text{[Expression 5]}$$

Since the phase compensation is unrealizable by the above expression as it is, phase compensation LPF as shown below is added to it.

$$F(s) = \frac{d_0}{c_1 s + c_0} \quad \text{[Expression 6]}$$

Finally, the above-mentioned phase compensation LPF is added to the transfer function from a yaw rate to a steering wheel angle, whereby the phase compensation can be realized by a transfer function as shown below.

$$G(s) = F(s)G_\gamma^\theta(s) = \frac{f_2 s^2 + f_1 s + f_0}{e_2 s^2 + e_1 s + e_0} \quad \text{[Expression 7]}$$

By digitizing the above expression by a well-known method, the phase compensation is realized by a microcomputer as shown by the following expression.

$$G(z) = \frac{q_2 z^2 + q_1 z + q_0}{p_2 z^2 + p_1 z + p_0} \quad \text{[Expression 8]}$$

In the case of phase compensation of a lateral acceleration:

A transfer function from a steering wheel angle to a lateral G is represented by the following expression.

$$G_\theta^g(s) = \frac{1}{D(s)}\frac{1}{n}\left(IK_f s^2 + \frac{K_f K_r l l_r}{V}s + K_f K_r l\right) \quad \text{[Expression 9]}$$

A transfer function from a yaw rate to a steering wheel angle can be represented by the following expression based on the above-mentioned transfer function.

$$G_g^\theta(s) = \frac{b_2 s^2 + b_1 s + b_0}{a_2 s^2 + a_1 s + a_0} \quad \text{[Expression 10]}$$

By digitizing the above expression by a well-known method, the transfer function takes the same form as the transfer function in the case of the phase compensation of a yaw rate.

In the case of phase compensation of a side slip angle:

A transfer function from a steering wheel angle to a side slip angle can be represented by the following expression. The transfer function takes the same form as the transfer function in the case of the phase compensation of a yaw rate.

$$G_\theta^\beta(s) = \frac{1}{D(s)}\frac{1}{n}\left(\frac{IK_f}{V}s + \frac{K_f K_r l l_r}{V^2} - mK_f l_f\right) \quad \text{[Expression 11]}$$

Figure 15:
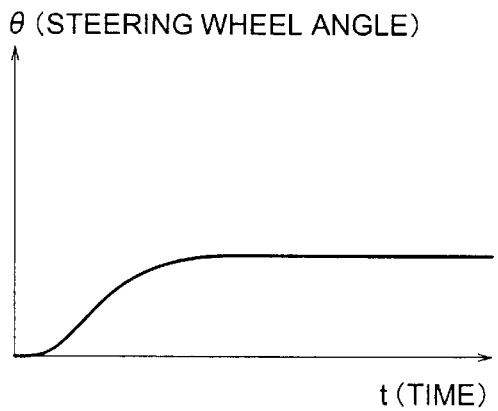
FIG. 15 is a graph showing time response of a steering wheel angle in the fifth embodiment of the present invention.
Figure 16:
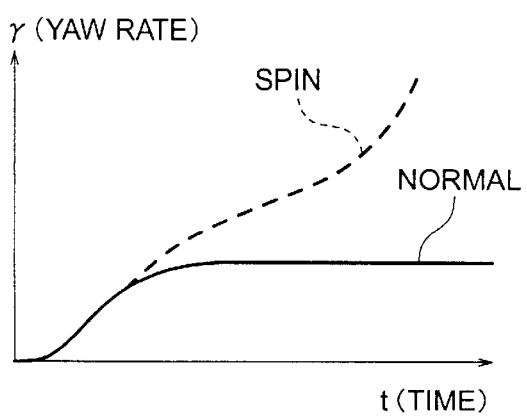
FIG. 16 is a graph showing time response of a yaw rate in the fifth embodiment of the present invention.
Figure 17:
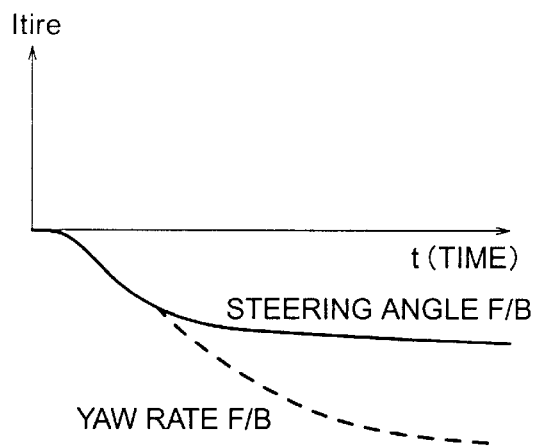
FIG. 17 is a graph showing time response of a steering wheel return torque in the fifth embodiment of the present invention.

In the case of this fifth embodiment, a yaw rate has a characteristic of phase delay with a time constant delayed by more than 1 Hz with respect to a steering wheel angle. Thus, if the steering wheel is operated fast, since a phase of a superimposed reaction force torque is slightly delayed with respect to an angle of the steering wheel, a vehicle operator may feel a sense of incongruity. In order to prevent this, a yaw rate, for which a phase is advanced through a phase compensator equivalent to an inverse function of the transfer function of a yaw rate with respect to a steering wheel angle, is multiplied by a gain. In this way, if a vehicle behavior is stable, the same steering feeling as that of the case where a steering wheel angle is multiplied by a gain can be realized. In addition, for example, if a vehicle spins on a low μ road as shown in FIG. 16 by a steering wheel operation as shown in FIG. 15, the yaw rate is larger than that of the case where the vehicle runs normally on a high μ road or the like. As a result, since a steering wheel return current Itire is larger, that is, a superimposed reaction force torque is also larger (see FIG. 17) in the case of yaw rate F/B than in the case of steering angle F/B, counter steering can be also easily performed when the vehicle starts to spin.

Sixth Embodiment

Figure 18:
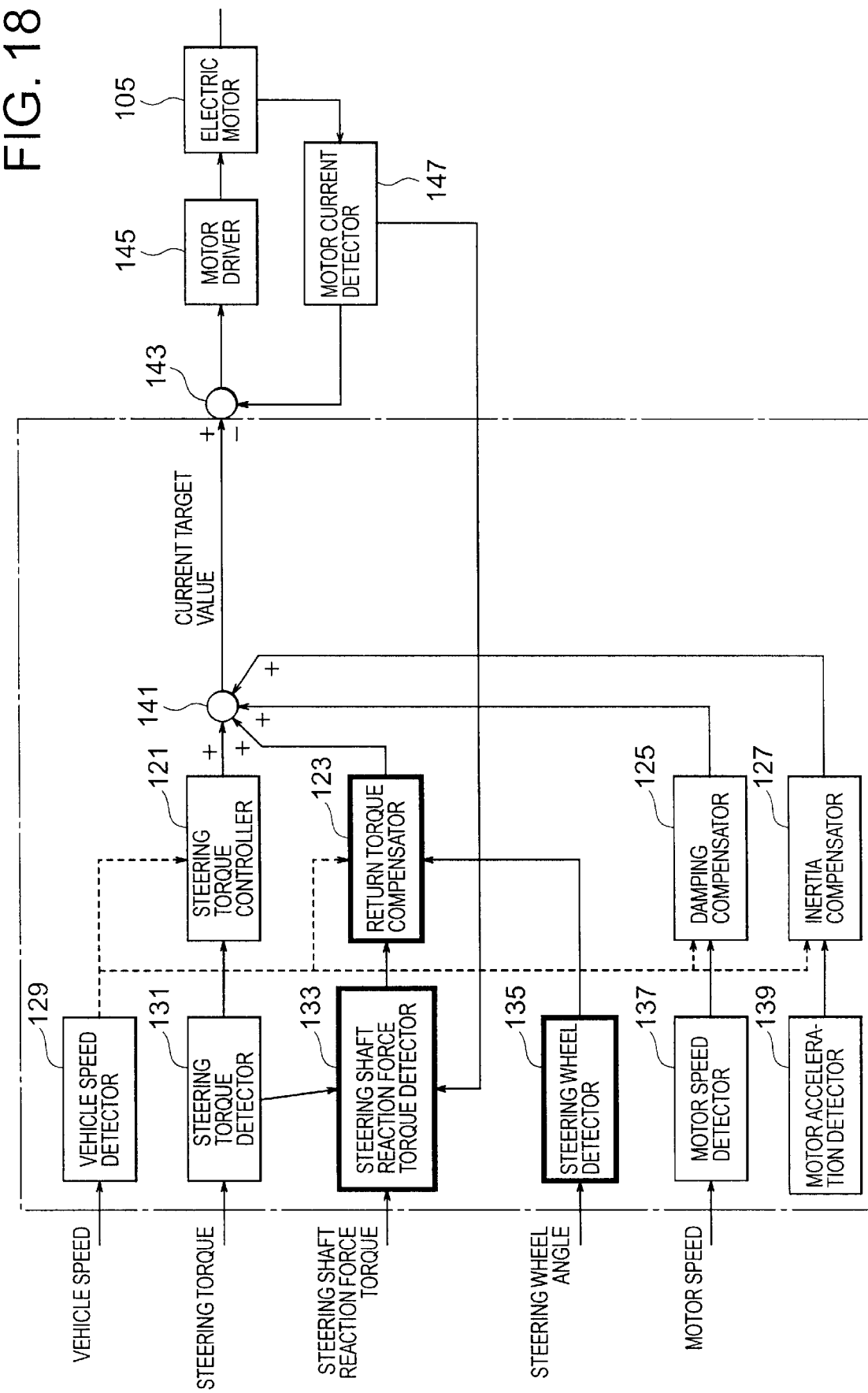
FIG. 18 is a block diagram showing a functional configuration of an ECU in a sixth embodiment of the present invention.

FIG. 18 is a block diagram showing a functional configuration of a sixth embodiment of the present invention. In this figure, the part surrounded by dashed line is a portion for calculating a target value of a current to be applied to the electric motor 105.

This sixth embodiment is completely the same as the above-mentioned first embodiment except that a steering shaft reaction force torque is estimated from an output of the steering torque detector 131 and an output of the motor current detector 147 for detecting a current of the electric motor 105 to thereby be used.

Figure 19:
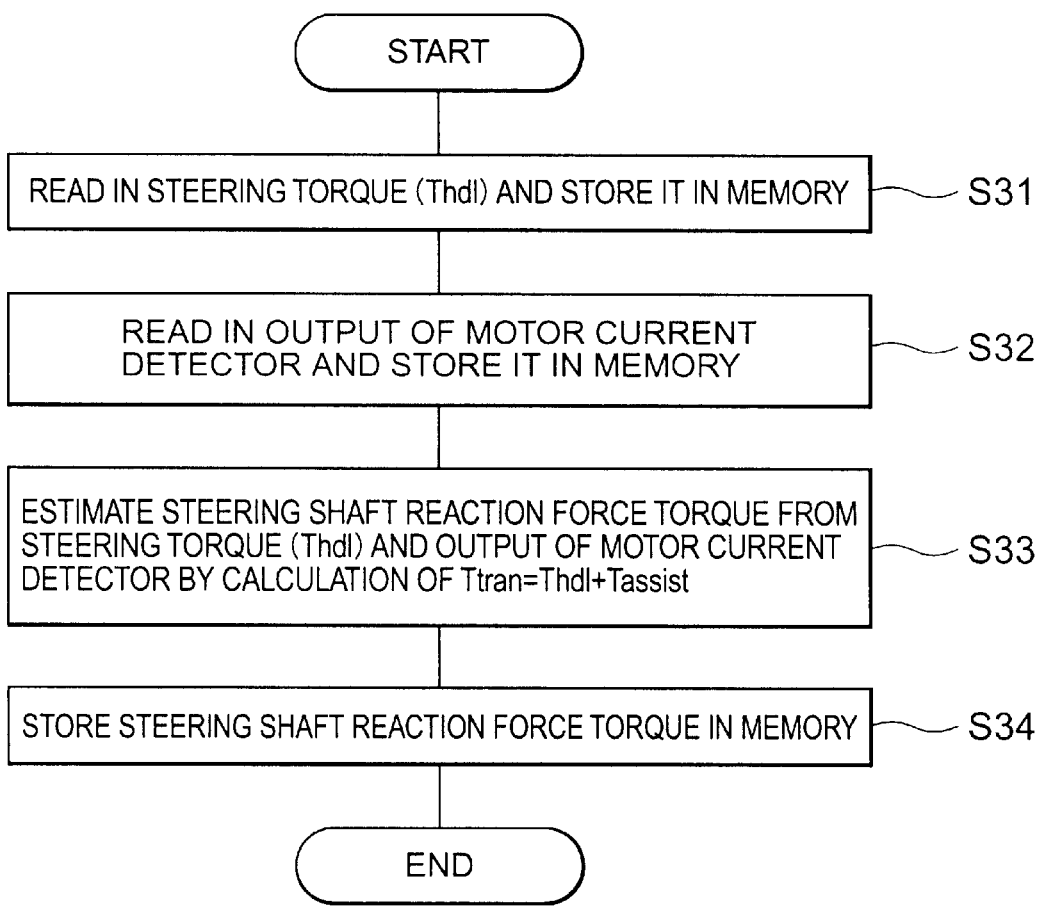
FIG. 19 is a flow chart showing a part of operations of a return torque compensating unit of the sixth embodiment of the present invention.

Operations of this sixth embodiment will be described based on a flow chart of FIG. 19. This flow chart specifically represents the operation "a steering shaft reaction force torque is read in and stored in the memory" of step S3 of FIG. 3 in the above-mentioned first embodiment.

First, a steering torque Thdl is read in and stored in a memory in step S31 and an output Tassist of the motor current detector 147 for detecting a current of the electric motor 105 is read in and stored in the memory in step S32. Then, a steering shaft reaction force torque Ttran is estimated from the steering torque Thdl and the output Tassist of the motor current detector 147 in step S33 and the steering shaft reaction force torque Ttran thus estimated is stored in the memory in step S34.

If an inertia moment of the electric motor 105 is not specifically large, in general, the steering shaft reaction force torque Ttran balances the steering torque Thdl and the assist torque Tassist by the electric motor 105 in the relationship indicated by the following expression.

$$Ttran=Thdl+Tassist$$

In this expression, the steering torque Thdl is always measured and known in the electric power steering. In addition, the relationship of the following expression is established for the assist torque Tassist by the electric motor 105.

$$Tassist=Ggear\cdot Kt\cdot Imtr$$

In the case of this sixth embodiment, it becomes unnecessary to add a steering shaft reaction force torque sensor. The other effects are completely the same as those in the above-mentioned first embodiment.

Seventh Embodiment

Figure 20:
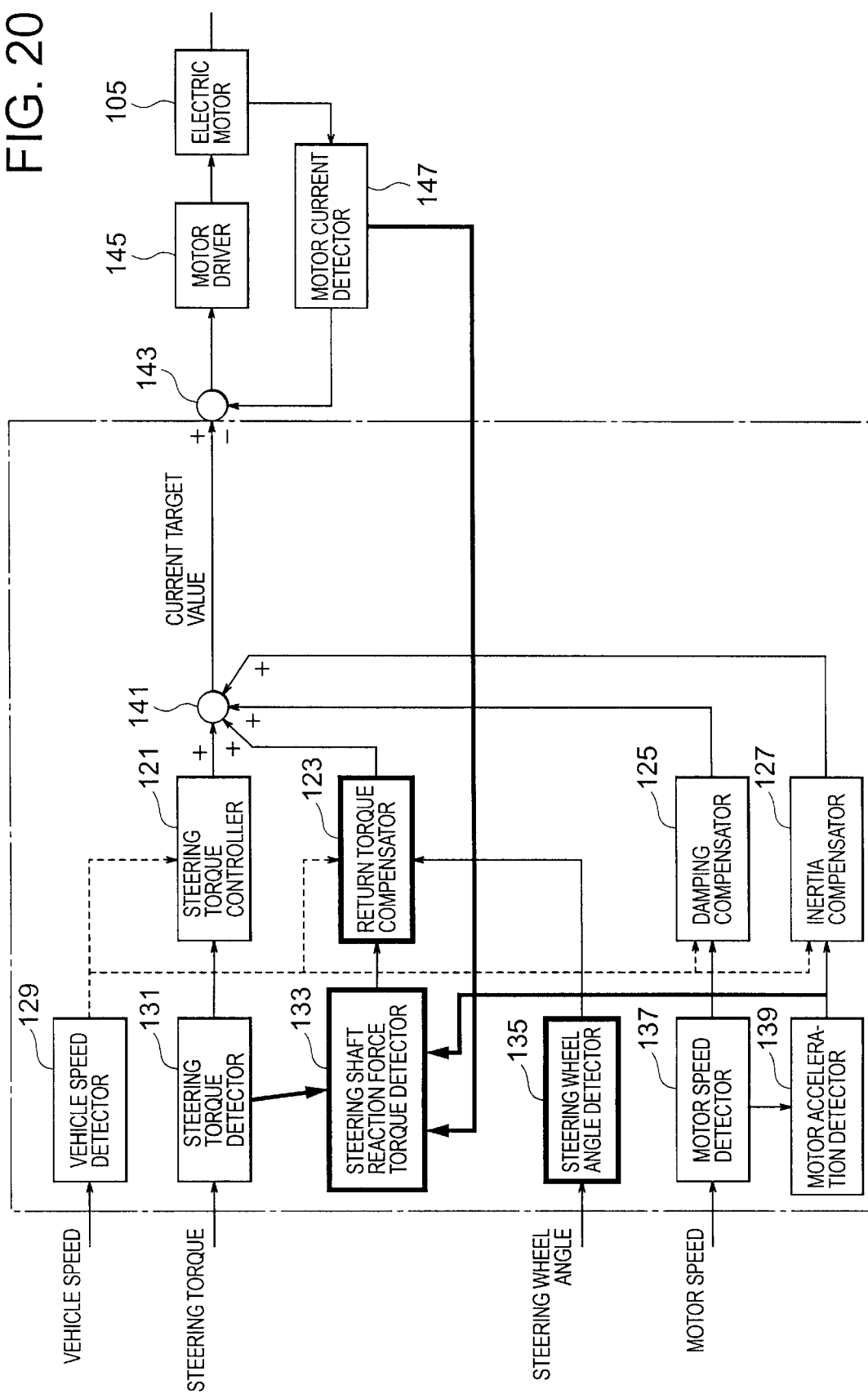
FIG. 20 is a block diagram showing a functional configuration of an ECU according to a seventh embodiment of the present invention.

FIG. 20 is a block diagram showing a functional configuration of a seventh embodiment of the present invention. In this figure, the part surrounded by dashed line is a portion for calculating a target value of a current to be applied to the electric motor 105.

This seventh embodiment is completely the same as the above-mentioned sixth embodiment except that a steering shaft reaction force torque is estimated using an output of the motor acceleration detector 139 for detecting a rotating acceleration of the electric motor 105 in addition to an output of the steering torque detector 131 and an output of the motor current detector 147 for detecting a current of the electric motor 105.

Figure 21:
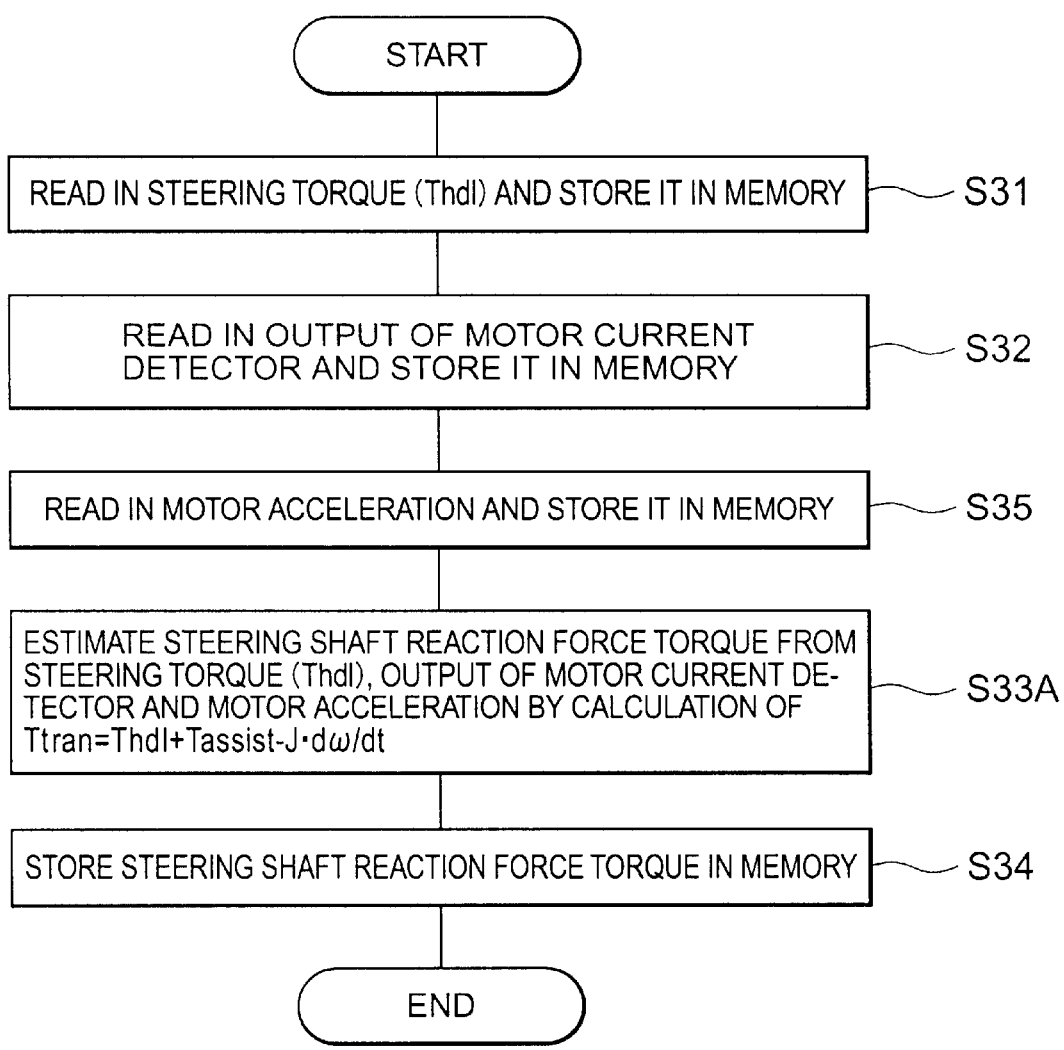
FIG. 21 is a flow chart showing a part of operations of a return torque compensating unit of the seventh embodiment of the present invention.

Operations of this seventh embodiment will be described based on a flow chart of FIG. 21. This flow chart specifically represents the operation "a steering shaft reaction force torque is read in and stored in the memory" of step S3 of FIG. 3 in the above-mentioned first embodiment.

In the above-mentioned sixth embodiment, a steering shaft reaction force torque Ttran is estimated from a steering torque Thdl and an output Tassist of the motor current detector 147. In this seventh embodiment, the steering shaft reaction force torque Ttran is estimated from a rotating acceleration of the electric motor 105 in addition to the steering torque Thdl and the output Tassist. The other steps are completely the same as those in the above-mentioned sixth embodiment.

That is, in this seventh embodiment, after step S32, a motor acceleration is read in from the motor acceleration detector 139 and stored in the memory in step S35. Then, a steering shaft reaction force torque Ttran is estimated from a steering torque Thdl, an output Tassist of the motor current detector 147 and an output of the motor acceleration detector 139 in step S33A and the steering shaft reaction force torque Ttran thus estimated is stored in the memory in step S34.

The steering shaft reaction force torque Ttran balances the steering torque Thdl, the assist torque Tassist by the electric motor 105 and an inertia torque J·dω/dt of the electric motor 105 in the relationship indicated by the following expression.

$$Ttran=Thdl+Tassist-J\cdot d\omega/dt$$

In this expression, the steering torque Thdl is always measured and known in the electric power steering. In addition, as mentioned above, the relationship of the following expression is established for the assist torque Tassist by the electric motor 105.

$$Tassist=Ggear\cdot Kt\cdot Imtr$$

Actions and effects of this seventh embodiment is the same as those in the above-mentioned sixth embodiment.

Eighth Embodiment

Figure 22:
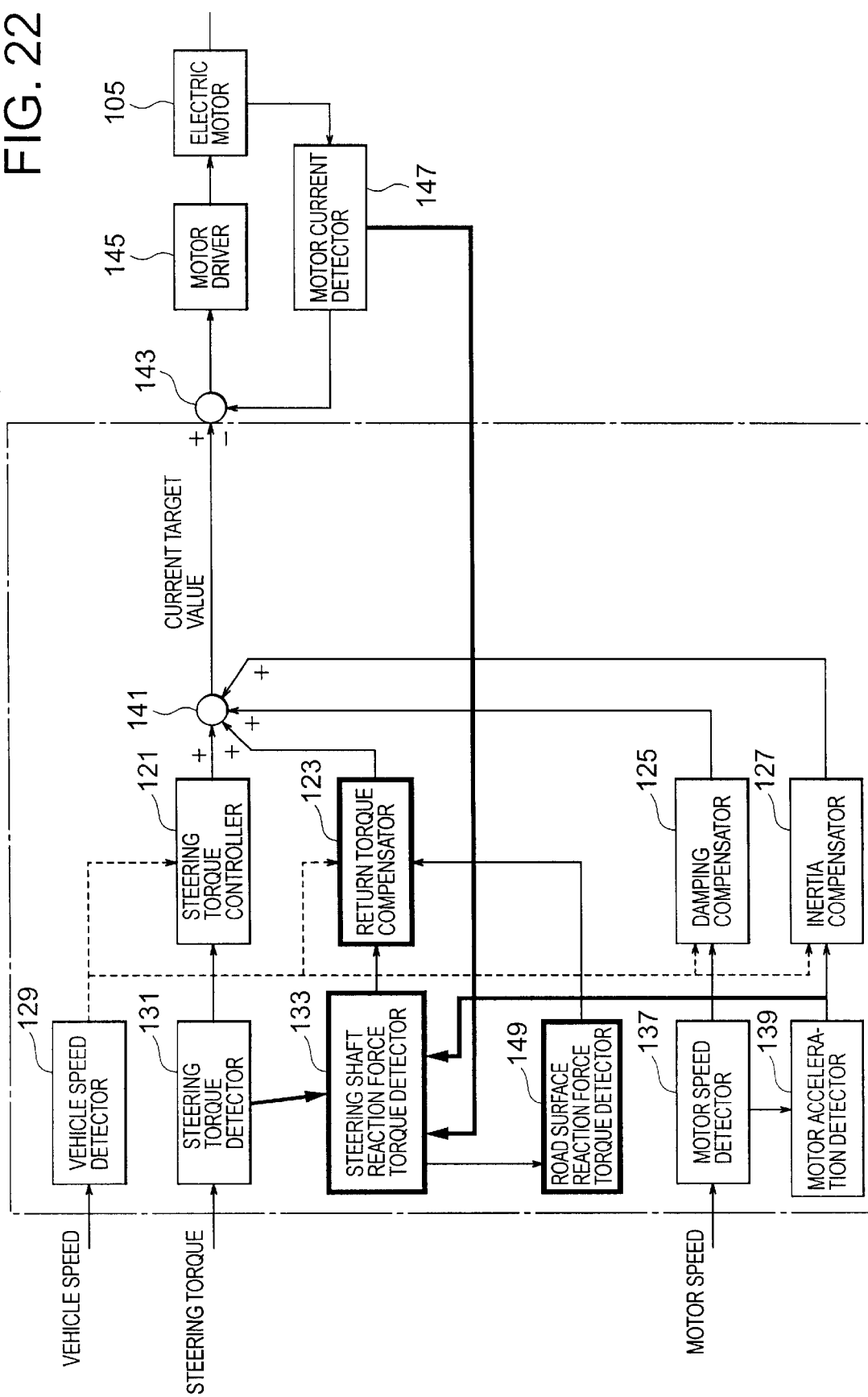
FIG. 22 is a block diagram showing a functional configuration of an ECU in accordance with an eighth embodiment of the present invention.

FIG. 22 is a block diagram showing a functional configuration of an eighth embodiment of the present invention. In this figure, the part surrounded by dashed line is a portion for calculating a target value of a current to be applied to the electric motor 105.

This eighth embodiment is completely the same as the above-mentioned third embodiment except that a steering shaft reaction force torque is estimated using an output of the motor acceleration detector 139 in addition to an output of the steering torque detector 131 and an output of the motor current detector 147 and that a road surface reaction force torque is estimated from a steering shaft reaction force torque and a gain is changed according to an output of the steering shaft reaction force torque detector 133. The other principles and effects are completely the same as those of the third embodiment.

Figure 10:
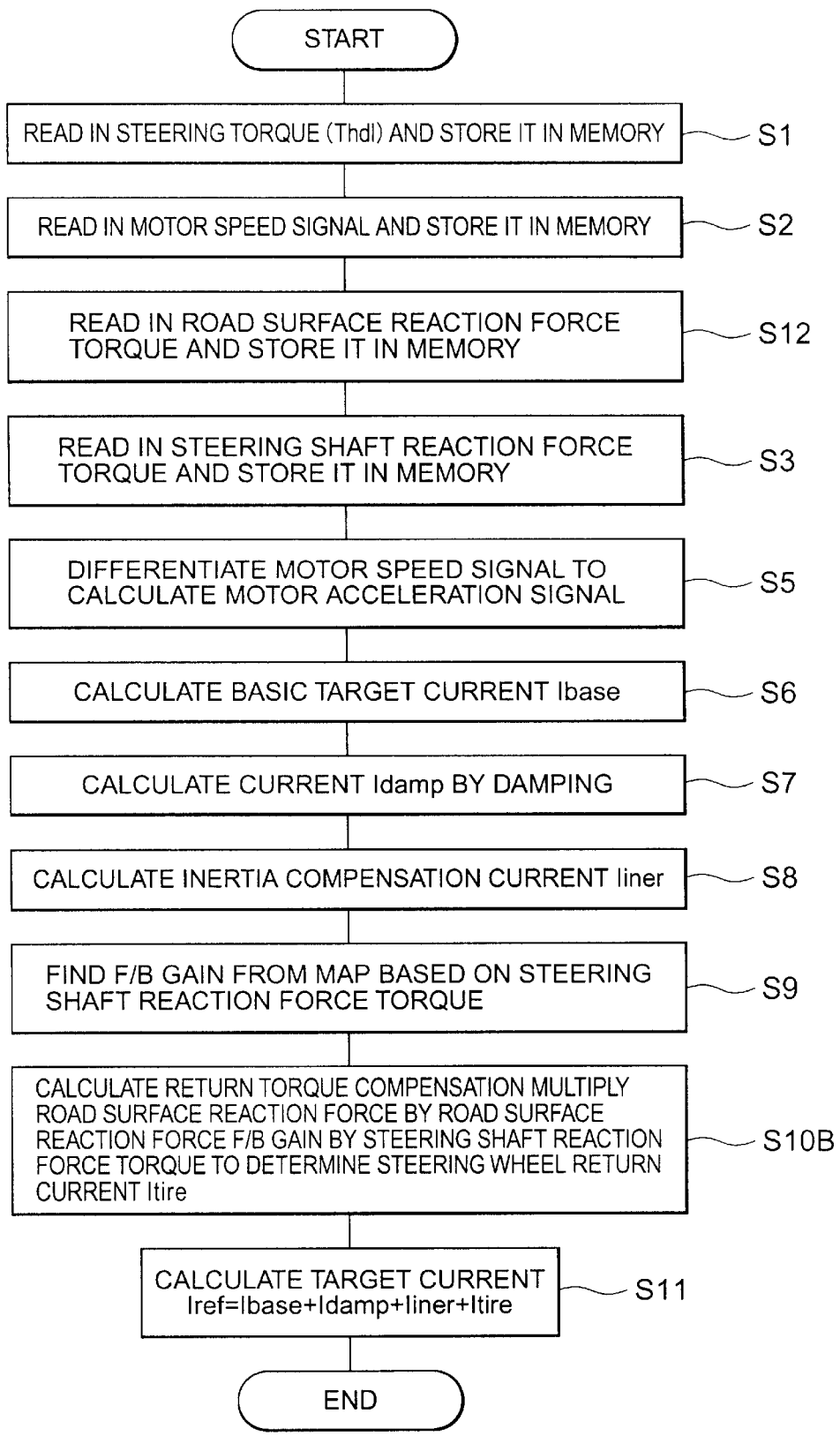
FIG. 10 is a flow chart showing operations of a return torque compensating unit of the third embodiment of the present invention.
Figure 23:
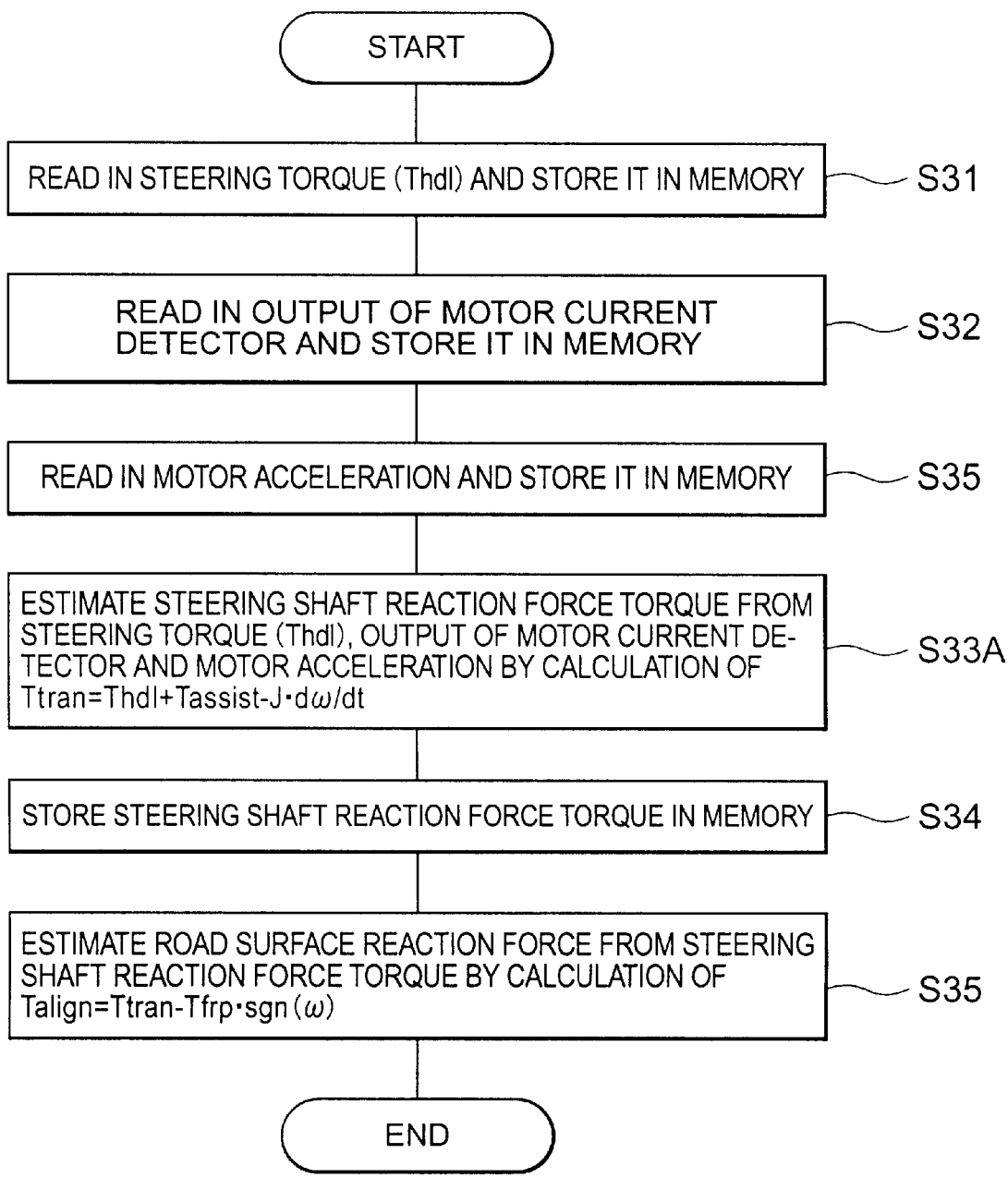
FIG. 23 is a flow chart showing a part of operations of a return torque compensating unit of the eighth embodiment of the present invention.
Figure 24:
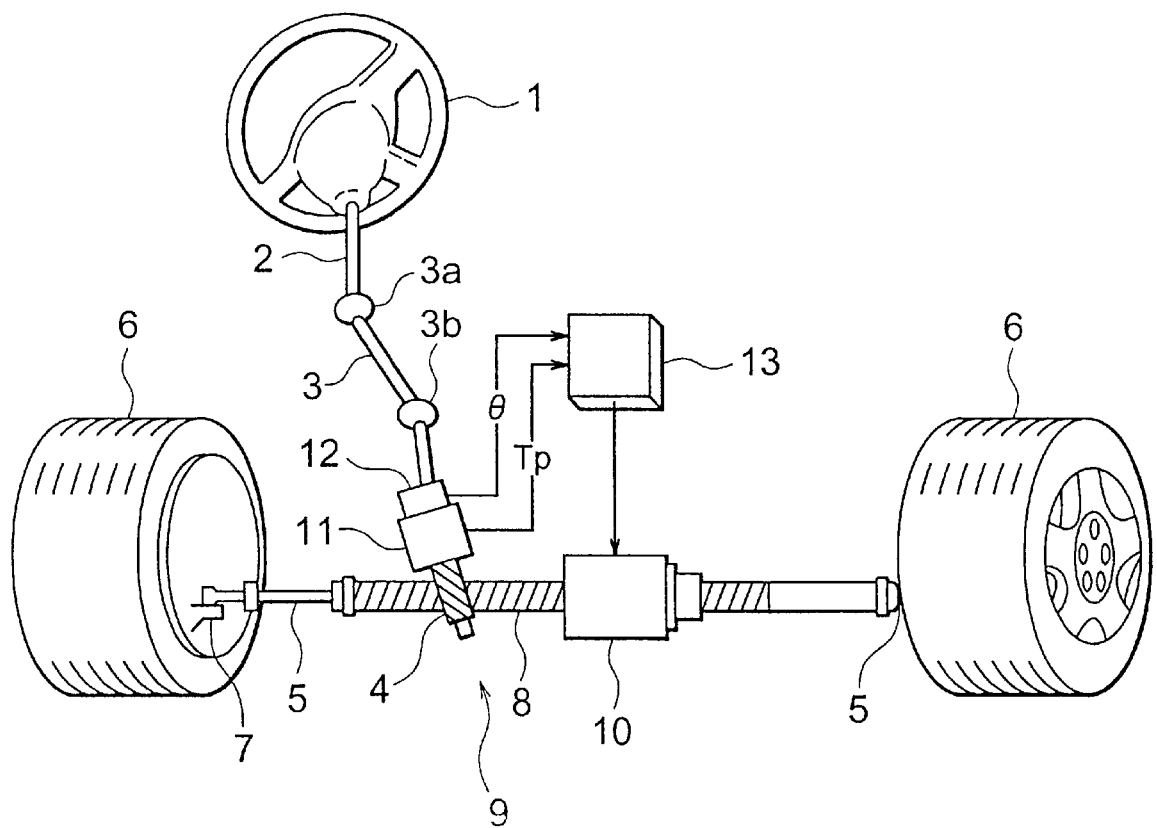
FIG. 24 illustrates a schematic configuration of a conventional electric power steering controller.
Figure 25:
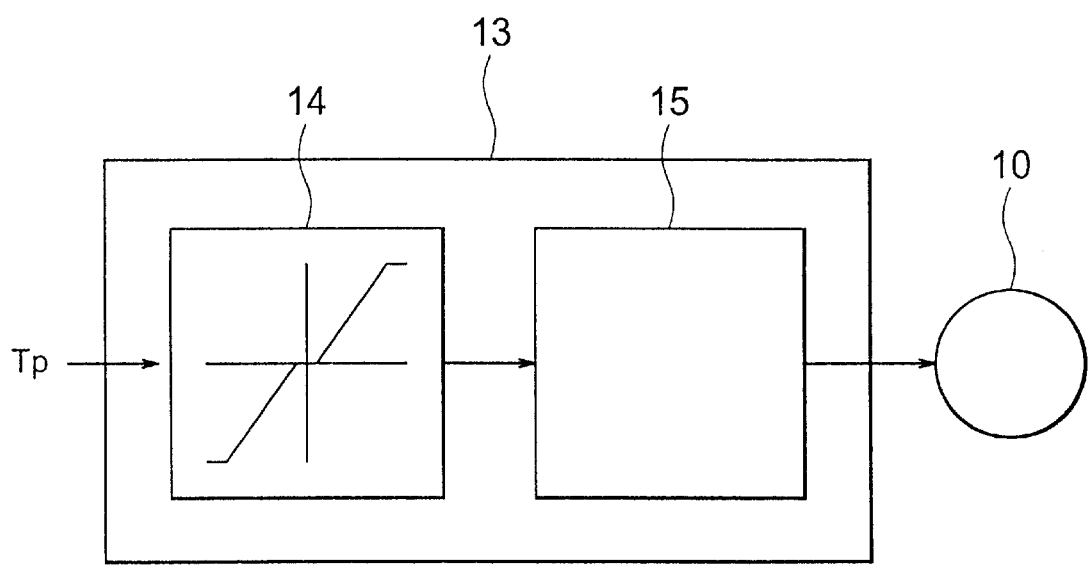
FIG. 25 illustrates a functional configuration of control means for controlling an electric motor in the conventional electric power steering controller.

Operations of this eighth embodiment will be described based on a flow chart of FIG. 23. This flow chart specifically represents the operation "a steering shaft reaction force torque is read in and stored in the memory" of step S3 and the operation "a road surface reaction force torque is read in and stored in the memory" of step S12 of FIG. 10 in the above-mentioned third embodiment.

That is, operations from step S31 to step S34 in which a steering shaft reaction force torque is estimated are the same as those of the above-mentioned seventh embodiment. Then, in step S35, a road surface reaction force is estimated from the estimated steering shaft reaction force torque. The other steps are completely the same as those of the third embodiment.

A road surface reaction force Talign is given by subtracting a friction term Tfrp·sgn(ω) from the steering shaft reaction force torque Ttran and is represented by the following expression.

$$Talign = Ttran - Tfrp \cdot sgn(\omega)$$

In the case of this eighth embodiment, it becomes unnecessary to provide a new sensor with, for example, a load cell disposed in a rack of a rack and pinion mechanism. The other effects are completely the same as those in the above-mentioned third embodiment.

As described above, the electric power steering controller in accordance with the present invention is provided with a steering shaft reaction force torque sensor for detecting a reaction force torque of a steering system; a superimposed reaction force torque calculating unit for multiplying a steering angle detected by the steering angle sensor by a gain to calculate a superimposed reaction force torque in the return direction of a steering wheel; and a control unit for controlling the gain such that the superimposed reaction force torque is reduced when a reaction force torque of the steering system is large and the superimposed reaction force torque is increased when a reaction force of the steering system is small. Thus, it becomes possible to decrease the superimposed reaction force torque when a steering shaft reaction force torque is large and increase the superimposed reaction force torque when the steering shaft reaction force torque is small by making a gain for calculating the superimposed reaction force torque variable, whereby a return amount of a steering wheel can be improved without making a steering shaft reaction force after compensation, to which the superimposed reaction force torque is added, unnecessarily large compared with the case in which a gain is constant. In addition, on a slippery road surface, if a gain is constant, fall of a road surface reaction force is hard to be seen when the steering wheel is gradually turned. However, since a vehicle operator can easily sense slippery feeling by making a gain for calculating a torque in the steering wheel return direction variable, the tendency for the vehicle operator to excessively cut the steering wheel on a slippery road can be prevented.

In addition, the electric power steering controller in accordance with the present invention is provided with a steering angle sensor for detecting a steering angle representing a rotating angle from a neutral position of a steering wheel; a road surface reaction force torque determining unit for determining a reaction force torque of a road surface on which a vehicle runs; a superimposed reaction force torque calculating portion for multiplying a steering angle detected by the steering angle sensor by a gain to calculate a superimposed reaction force torque in the return direction of a steering wheel; and a control unit for controlling the gain such that the superimposed reaction force torque is reduced when the road surface reaction force torque is large and the superimposed reaction force torque is increased when the road surface reaction force torque is small. Thus, it becomes possible to decrease a superimposed reaction force torque when a steering shaft reaction force torque is large and increase the superimposed reaction force torque when the steering shaft reaction force torque is small by making a gain for calculating the superimposed reaction force torque variable, whereby a return amount of a steering wheel can be improved without making a steering shaft reaction force after compensation, to which the superimposed reaction force torque is added, unnecessarily large compared with the case in which a gain is constant. In addition, on a slippery road surface, if a gain is constant, fall of a road surface reaction force is hard to be seen when the steering wheel is gradually turned. However, since a vehicle operator can easily sense slippery feeling by making a gain for calculating a torque in the steering wheel return direction variable, the tendency for the vehicle operator to excessively cut the steering wheel on a slippery road can be prevented. Moreover, a superimposed reaction force torque is made a product of a steering angle and a gain, whereby it can be realized to generate a superimposed reaction force torque that is substantially proportional to a turning angle of a steering wheel if a steering shaft reaction force torque is small and to make a superimposed reaction force torque small if the steering shaft reaction force is large without detecting a steering wheel angle.

Further, the electric power steering controller in accordance with the present invention is provided with a steering shaft reaction force torque sensor for detecting a reaction force torque of a steering system; a road surface reaction force torque determining unit for determining a reaction force torque of a road surface on which a vehicle runs; a superimposed reaction force torque calculating portion for multiplying a road surface reaction force determined by the road surface reaction force torque determining unit by a gain to calculate a superimposed reaction force torque in the return direction of a steering wheel; and a control unit for controlling the gain such that the superimposed reaction force torque is reduced when the reaction force torque of a steering system is large and the superimposed reaction force torque is increased when the reaction force torque of a steering system is small. Thus, it becomes possible to decrease a superimposed reaction force torque when a steering shaft reaction force torque is large and increase the superimposed reaction force torque when the steering shaft reaction force torque is small by making a gain for calculating the superimposed reaction force torque variable, whereby a return amount of a steering wheel can be improved without making a steering shaft reaction force after compensation, to which the superimposed reaction force torque is added, unnecessarily large compared with the case in which a gain is constant. In addition, on a slippery road surface, if a gain is constant, fall of a road surface reaction force is hard to be seen when the steering wheel is gradually turned. However, since a vehicle operator can easily sense slippery feeling by making a gain for calculating a torque in the steering wheel return direction variable, the tendency for the vehicle operator to excessively cut the steering wheel on a slippery road can be prevented. Moreover, for example, a load cell is provided for a rack of a rack and pinion mechanism and thus, in the case where a road surface reaction force torque is directly measured, a gain is changed based on a road surface reaction force torque rather than a steering shaft reaction force torque.

Moreover, the electric power steering controller in accordance with the present invention is provided with a road surface reaction force torque determining unit for determining a reaction force torque of a road surface on which a vehicle runs; a superimposed reaction force torque calculating portion for multiplying a road surface reaction force torque determined by the road surface reaction force torque determining unit by a gain to calculate a superimposed reaction force torque in the return direction of a steering wheel; and a control unit for controlling the gain such that the superimposed reaction force torque is reduced when the road surface reaction force torque is large and the superimposed reaction force torque is increased when the road surface reaction force torque is small. Thus, it becomes possible to decrease a superimposed reaction force torque when a steering shaft reaction force torque is large and increase the superimposed reaction force torque when the steering shaft reaction force torque is small by making a gain for calculating the superimposed reaction force torque variable, whereby a return amount of a steering wheel can be improved without making a steering shaft reaction force after compensation, to which the superimposed reaction force torque is added, unnecessarily large compared with the case in which a gain is constant. In addition, on a slippery road surface, if a gain is constant, fall of a road surface reaction force is hard to be seen when the steering wheel is gradually turned. However, since a vehicle operator can easily sense slippery feeling by making a gain for calculating a torque in the steering wheel return direction variable, the tendency for the vehicle operator to excessively cut the steering wheel on a slippery road can be prevented. Moreover, for example, a load cell is provided for a rack of a rack and pinion mechanism and thus, in the case where a road surface reaction force torque is directly measured, a gain can be changed based on a road surface reaction force torque rather than a steering shaft reaction force torque.

In addition, the electric power steering controller in accordance with the present invention is provided with a steering shaft reaction force torque sensor for detecting a reaction force torque of a steering system; a quantity of state sensor for detecting a quantity of state of any one of a yaw rate, a lateral acceleration and a side slip angle of a vehicle; a superimposed reaction force torque calculating unit for multiplying a quantity of state of any one of a yaw rate, a lateral acceleration and a side slip angle of a vehicle detected by the quantity of state sensor by a gain to calculate a superimposed reaction force torque in the return direction of a steering wheel; and a control unit for controlling the gain such that the superimposed reaction force torque is reduced when the reaction force torque of a steering system is large and the superimposed reaction force torque is increased when the reaction force torque of a steering system is small. Thus, a superimposed reaction force torque is made a product of a quantity of state of any one of a yaw rate, a lateral acceleration and a side slip angle and a gain, whereby a superimposed reaction force torque according to a vehicle behavior can be generated and an appropriate superimposed reaction force torque can be given even if a relation between a steering wheel angle and a vehicle behavior is different from that at the time of normal running in a case where a vehicle state is unstable and the like.

Moreover, the electric power steering controller in accordance with the present invention is provided with a quantity of state sensor for detecting a quantity of state of any one of a yaw rate, a lateral acceleration and a side slip angle of a vehicle; a road surface reaction force torque determining unit for determining a reaction force torque of a road surface on which a vehicle runs; a superimposed reaction force torque calculating unit for multiplying a quantity of state of any one of a yaw rate, a lateral acceleration and a side slip angle of a vehicle detected by the quantity of state sensor by a gain to calculate a superimposed reaction force torque in the return direction of a steering wheel; and a control unit for controlling the gain such that the superimposed reaction force torque is reduced when the road surface reaction force torque is large and the superimposed reaction force torque is increased when the road surface reaction force torque is small. Thus, a superimposed reaction force torque is made a product of a quantity of state of any one of a yaw rate, a lateral acceleration and a side slip angle and a gain, whereby a superimposed reaction force torque according to a vehicle behavior can be generated and an appropriate superimposed reaction force torque can be given even if a relation between a steering wheel angle and a vehicle behavior is different from that at the time of normal running in a case where a vehicle state is unstable and the like.

Furthermore, the electric power steering controller in accordance with the present invention is provided with a steering angle sensor for detecting a steering angle representing a rotating angle from a neutral position of a steering wheel; a motor current detector for detecting a motor current to be supplied to an electric motor for power steering connected to a steering system; a steering torque sensor for detecting a toque at the time when a vehicle operator operates a steering wheel; a steering shaft reaction force torque calculating unit for estimating a reaction force torque of a steering system from a motor current detected by the motor current detector and a steering torque detected by the steering torque sensor; a superimposed reaction force torque calculating unit for multiplying a steering angle detected by the steering angle sensor by a gain to calculate a superimposed reaction force torque in the return direction of a steering wheel; and a control unit for controlling the gain such that the superimposed reaction force torque is reduced when the reaction force torque of a steering system is large and the superimposed reaction force torque is increased when the reaction force torque of a steering system is small. Thus, it becomes possible to decrease a superimposed reaction force torque when a steering shaft reaction force torque is large and increase the superimposed reaction force torque when the steering shaft reaction force torque is small by making gain for calculating a superimposed reaction force torque variable, whereby a return amount of a steering wheel can be improved without making a steering shaft reaction force after compensation, to which the superimposed reaction force torque is added, unnecessarily large compared with the case in which a gain is constant. In addition, on a slippery road surface, if a gain is constant, fall of a road surface reaction force is hard to be seen when the steering wheel is gradually turned. However, since a vehicle operator can easily sense slippery feeling by making a gain for calculating a torque in the steering wheel return direction variable, the tendency for the vehicle operator to excessively cut the steering wheel on a slippery road can be prevented. Moreover, a superimposed reaction force torque is made a product of a steering angle and a gain, whereby it can be realized to generate a superimposed reaction force torque that is substantially proportional to a turning angle of a steering wheel if a steering shaft reaction force is small and to make a superimposed reaction force torque small if the steering shaft reaction force is large without detecting a steering wheel angle.

In addition, a reaction force torque Ttran of the steering system is calculated by the following expression.

$$Ttran = Thdl + Tassist - J \cdot dw/dt$$

Here, Thdl is a steering torque, Tassis is an assist torque by a motor and $J \cdot dw/dt$ is an inertia torque of the motor. In general, since a magnitude of friction Tfrp is known in particular, it is possible to compensate for the reaction force toque Ttran if only a rotating direction of the electric motor is found. Since the rotating direction of the electric motor is found from the electric motor and an estimated value of a counter-electromotive voltage, the reaction force torque Ttran can be compensated for. In addition, in this case, it also becomes unnecessary to provide a new sensor with, for example, a load cell disposed in a rack of a rack and pinion mechanism.

Moreover, since the road surface reaction force torque is found by subtracting a friction torque of the steering system from a reaction force torque of the steering system, it becomes unnecessary to actually measure a road surface reaction force torque and, therefore, it becomes unnecessary to provide a road surface reaction force torque sensor.

Thus, it is seen that an electric power steering controller is provided. One skilled in the art will appreciate that the present invention can be practiced by other than the preferred embodiments which are presented for the purposes of illustration and not of limitation, and the present invention is limited only by the claims which follow.

What is claimed is:

1. An electric power steering controller comprising:

a steering angle sensor for detecting a steering angle relative to a central neutral position of a steering wheel of a steering system including said electric power steering controller;

a reaction force torque detecting unit for detecting a reaction force torque of a steering system, said reaction force torque detecting unit including a steering shaft reaction force torque sensor for detecting the reaction force torque of the steering shaft; and a return torque compensator for calculating a compensating return torque superimposed on the reaction force torque returning the steering wheel in a return direction toward the neutral position of the steering wheel, said return torque compensator calculating the compensating return torque by multiplying the steering angle detected by said steering angle sensor by a feedback gain varying with the reaction force torque so that the compensating return torque superimposed on the reaction force torque changes inversely with magnitude of the reaction force torque of the steering shaft.

2. The electric power steering controller according to claim 1, wherein the feedback gain decreases when the magnitude of the reaction force torque of the steering shaft exceeds a threshold value.

* * * * *